(12) United States Patent
Sugiura et al.

(10) Patent No.: US 7,495,786 B2
(45) Date of Patent: *Feb. 24, 2009

(54) IMAGE PROCESSING METHOD AND IMAGE PROCESSING SYSTEM

(75) Inventors: Hiroaki Sugiura, Tokyo (JP); Shuichi Kagawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1352 days.

This patent is subject to a terminal disclaimer.

(21) Appl. No.: 09/994,761

(22) Filed: Nov. 28, 2001

(65) Prior Publication Data

US 2002/0080380 A1    Jun. 27, 2002

Related U.S. Application Data

(63) Continuation-in-part of application No. 09/627,058, filed on Jul. 27, 2000, now Pat. No. 6,980,325.

(51) Int. Cl.
*G06F 15/00* (2006.01)
*G06F 17/28* (2006.01)

(52) U.S. Cl. ..................... 358/1.13; 715/528

(58) Field of Classification Search .......... 358/1.9, 358/1.2, 1.13, 3.2, 3.1, 3.11, 1.16, 518, 520, 358/523; 347/5, 19, 41, 49; 715/528; 345/22
See application file for complete search history.

(56) References Cited

U.S. PATENT DOCUMENTS

| | | | |
|---|---|---|---|
| 4,740,833 A | 4/1988 | Shiota et al. | |
| 4,887,150 A | 12/1989 | Chiba et al. | |
| 4,989,079 A | 1/1991 | Ito | |
| 5,243,447 A | 9/1993 | Bodenkamp et al. | |
| 5,255,083 A | 10/1993 | Capitant et al. | |
| 5,349,452 A | 9/1994 | Maeda et al. | |
| 5,359,437 A * | 10/1994 | Hibi ............................ 358/529 | |
| 5,436,733 A | 7/1995 | Terada et al. | |

(Continued)

FOREIGN PATENT DOCUMENTS

EP    0665680 A2    8/1995

(Continued)

*Primary Examiner*—Saeid Ebrahimi Dehkordy
(74) *Attorney, Agent, or Firm*—Birch, Stewart, Kolasch & Birch, LLP

(57) ABSTRACT

Disclosed are a method (and computer system embodying the method) of outputting original image data that was generated relative to a first color space by an output device that converts image data of a second color space to a visually-perceptible analog thereof. Such a method comprises: receiving from a provider, over a communication channel, original image data that was generated according to a first color space; receiving from the provider, over a communication channel along with the image data, tag data representing parameters of the first color space; the output device automatically converting the original image data into the second color space according to the tag data to produce converted image data; and the output device converting the converted image data into a visually-perceptible analog thereof. Alternatively, the output device can monitor the presence of tag data. If none is received, the output device can presume that the first color space is a default color space, parameters of which are stored in memory. The output device can convert the original image data into the second color space based upon the presumption that the first color space is the default color space.

22 Claims, 13 Drawing Sheets

U.S. PATENT DOCUMENTS

| | | |
|---|---|---|
| 5,588,050 A | 12/1996 | Kagawa et al. |
| 5,659,406 A | 8/1997 | Imao et al. |
| 5,751,449 A | 5/1998 | Nobuta |
| 5,806,081 A * | 9/1998 | Swen et al. ............... 715/202 |
| 5,881,168 A | 3/1999 | Takaoka et al. |
| 5,933,252 A | 8/1999 | Emori et al. |
| 5,940,089 A | 8/1999 | Dilliplane et al. |
| 5,987,167 A | 11/1999 | Inoue |
| 6,091,518 A | 7/2000 | Anabuki |
| 6,125,202 A | 9/2000 | Kagawa et al. |
| 6,337,922 B2 * | 1/2002 | Kumada ................. 382/162 |
| 6,421,094 B1 | 7/2002 | Han |
| 6,434,268 B1 | 8/2002 | Asamura et al. |
| 6,509,910 B1 * | 1/2003 | Agarwal et al. ........... 715/752 |
| 6,778,291 B1 * | 8/2004 | Clouthier ................. 358/1.16 |

FOREIGN PATENT DOCUMENTS

| | | |
|---|---|---|
| EP | 0 837 601 A2 | 4/1998 |
| EP | 0961481 A2 | 12/1999 |
| EP | 1028586 A | 8/2000 |
| JP | B2-63-39188 | 8/1988 |
| JP | 63-227181 | 9/1988 |
| JP | 2-30226 | 7/1990 |
| JP | 5-48885 | 2/1993 |
| JP | 5-183742 | 7/1993 |
| JP | 7-023245 | 1/1995 |
| JP | 7170404 | 7/1995 |
| JP | 8-321964 | 12/1996 |
| JP | 11-17974 | 1/1999 |
| KR | 10-0244227 B1 | 11/1999 |

* cited by examiner

IMAGE PROCESSING METHOD AND IMAGE PROCESSING SYSTEM

This application is a continuation-in-part of application Ser. No. 09/627,058 filed on Jul. 27, 2000, now U.S. Pat. No. 6,980,323 the entire contents of which are hereby incorporated by reference.

FIELD OF THE INVENTION

The invention relates to a method and a system for image processing, and is directed in particular toward outputting image data on an output device, and more particularly to automating color property adaptation for the output device, and more particularly to distributing the computational load for the color property adaptation to the output device.

BACKGROUND OF THE INVENTION

Digital image data can be generated relative to various color spaces, e.g., standard Red Green Blue (sRGB) (standardized by International Electrotechnical Commission (IEC) 61966-2-1), National Television Standards Committee (NTSC), Phase Alteration Line (PAL), SEquential Color And Memory (SECAM), etc. But the color space of the source of the image data is very often not the color space of the output device (such as a monitor, printer, projector, etc.) that converts the image data into a visually perceptible analog thereof. In other words, where the source of the image data operates in a first color space and the output device operates in a second color space, it is usually desirable to convert the image data from the first color space to the second color space before outputting it via the output device.

Typically, the Background Art (such as in FIG. 1) has performed the color space (CS) conversion in the Central Processing Unit (CPU) of a computing device (such as a personal computer), not in the output device. FIG. 1 depicts a block diagram of a personal computer system according to the Background Art.

In FIG. 1, a personal computer (PC) 100 is depicted as including a CPU 102 and an output device 106 connected to the CPU 102 by signal path 114. FIG. 1 also depicts a source of image data 108 connected to the CPU 102 by the signal paths 110 and 112. The CPU 102 has a color space (CS) conversion module 104 that performs the function of converting image data from a first color space to a second color space. Thus, CS translation or conversion module 104 is depicted as the termination point for the signal paths 110 and 112. The output device 106 is depicted as taking the form of a monitor 106A that is a component of the PC or as a printer 106B that is external to the PC. Each of the monitor 106A and the printer 106B is considered external to the CPU 102.

In operation, the image data source 108 provides image data based in the first color space (CS1) and tag data representing parameters of the first color space via signal paths 110 and 112, respectively, to the CS conversion module 104 within the CPU 104 of the PC 102. Then, the CS conversion module 104 automatically converts the image data from the first color space to the second color space (CS2) according to the tag data for the first color space. And then the CS conversion module 104 outputs the image data based in the second color space to the output device 106 via the signal path 114.

It is noted that separate signal paths 110 and 112 for the image data and the associated tag data, respectively, have been depicted to emphasize that tag data is transferred to the CPU 102, while, in contrast, only CS2 image data is transferred out of the CPU 102 over the signal path 114. But it is not necessary that the image data and tag data be transmitted over two separate paths.

The CS conversion module 104 is typically implemented as software being run by the CPU 102. As such, the conversion speed of the software is limited by the system clock speed of the CPU 102. This raises the problem that the CPU, in general, cannot convert moving picture images (e.g., 100 million pixels per second) fast enough so that the moving pictures can be displayed on the output device (here, the monitor 106A) in real time.

The PC 100 of FIG. 1 has another problem. Suppose that it has to drive a second output device (not depicted), e.g., a liquid crystal display (LCD) projector, which is a typical requirement of a laptop PC. If the color space of the second output device is different than the color space (CS3) of the monitor 106A, the color conversion module 104 will attempt to convert the original image data from the source 108 into both CS2 image data and CS3 image data concurrently. For all but the smallest of image data sets, this represents a computational load that cannot be serviced in real time by the CS conversion module 104, i.e., the CPU 102. As a result, the monitor 106A and the second monitor cannot display the same image concurrently in real time.

As represented by a computer monitor (not depicted) marketed by the MITSUBISHI ELECTRIC CORPORATION ("Mitsubishi Denki"), Model No. LXA580W, it is known in the Background Art to locate non-automatic color space conversion functionality in an output device. Such a monitor includes a memory-containing conversion circuitry to convert input image data from one of a plurality of color spaces into the color space of the monitor.

A viewer/user of the Background Art monitor marketed by Mitsubishi Denki can manipulate a dedicated interface on the front of the monitor case to select one of the plurality of color spaces. Processing circuitry within the monitor accordingly will treat the input image data as if it has been generated within the selected color space. The processing circuitry will convert the input image data from the selected color space into the color space of the monitor. Then, the converted image data is displayed. The viewer/user views the displayed data to decide if its appearance is acceptable. Through trial and error, the conversion resulting in the best display appearance (according to the viewer's/user's personal preferences) can be selected.

The Background Art monitor marketed by Mitsubishi Denki has the advantage of providing enhanced quality of the displayed image. But it has the disadvantage that the user/viewer must actively participate in the optimization process each time data from a different color space is to be displayed.

In addition, where the image data displayed in a plurality of so-called windows relating to color spaces different from each other, parameters used for the color space conversion may be optimum for one of the windows, but not for other windows, and the resultant color reproduction may not be optimum for the above-mentioned other windows.

Furthermore, for user/viewers accustomed to color reproduction of domestic television sets, the color reproduction desired for the still picture is different from the color reproduction desired for moving pictures. For this reason, the user/viewer must actively participate in the optimization of the color reproduction each time there is a switching between the still pictures and the moving pictures.

SUMMARY OF THE INVENTION

According to one aspect of the invention, there is provided a method of outputting original image data that was generated relative to a first color space by an output device that converts image data of a second color space to a visually-perceptible analog thereof, the method comprising:

receiving from a provider, over a communication channel, original image data that was generated according to a first color space;

receiving from said provider, over a communication channel along with said image data, tag data representing parameters of said first color space;

said output device automatically converting said original image data into said second color space according to said tag data to produce converted image data; and said output device converting said converted image data into a visually-perceptible analog thereof.

With the above arrangement, the output device performs color space (CS) conversion based on the tag data, so that it is not necessary for a separate device, such as a CPU of a personal computer connected to the output device, for controlling the output device to perform the conversion of the image data from the first color space to a second color space. For this reason, it is possible to display moving pictures at a speed at which devices in the background art could not. In addition, since the tag data is sent to the output device, and conversion is automatically performed based on the tag data sent to the output device, it is not necessary for the viewer/user to optimize the settings of the output device each time the color space of the input image data changes.

Moreover, since the output devices can perform the color space conversion, a device, such as a personal computer, for controlling the output devices can drive a plurality of output devices (that are designed to different color spaces), and yet the plurality of output devices, such a monitor and a printer, can convert the image data into visually perceptible analogs thereof concurrently in real time.

Furthermore, a device, such as a CPU of a personal computer, for controlling the output device may be made independent of the output device. In other words, the transfer of image data by a CPU to an output device can take place in an object-oriented manner, i.e., without the need for the CPU to adapt the image data to particulars of the output device. Conversely, output devices according to the invention achieve independence from the image data sources. That is, the output device can output image data from any color space without the need to receive image data converted to the color space of the output device.

It may be so arranged that said provider includes a computing device and said communication channel includes a direct connection between said computing device and said output device, or said provider includes a memory device and said communication channel includes a direct connection between said memory device and said output device; or said provider includes a server and said communication channel includes a network to which said output device is connected.

It may be so arranged that said output device includes a component of a personal computing device connected to said network.

In this case, said network connection may be wireless.

It may be so arranged that said provider receives said original image data from a source.

In this case, said source may include a scanner, a digital still camera, a video camera or a signal generator.

It may be so arranged that said output device includes a monitor, a projector or a printer.

It may be so arranged that said tag data include
a code identifying a color space,
primary coordinates,
white point,
brightness,
tone characteristics,
color reproduction characteristics,
still picture/moving picture identification code, or
parameters for image processing.

The still picture/moving picture identification code may be a code indicating that the image is supplied from a digital still camera (indicating that the image is a still picture), a code indicating that the image is supplied from a scanner (indicating that the image is a still picture), a code indicating that the image is supplied from a video camera (indicating that the image is a moving picture), or a code indicating that the image is supplied from a DVD drive having a function of playing back an image recorded on a DVD (indicating that the image is a moving picture).

With the above arrangement, the tag data can specify the characteristic of the color space, or the contents of the image processing that should be performed according to the output characteristic. When the tag data include a code identifying (indicating) a color space, it is possible to express the characteristic of the color space with a small number of data. When the tag data include primary coordinates (primary chromaticity), tone characteristic, or color reproduction characteristic, it is possible to express various color spaces flexibly, not being limited to a predefined color space.

Furthermore, for user/viewers accustomed to color reproduction of domestic television sets, it is desirable to switch the color reproduction between still pictures and moving pictures. By using the still picture/moving picture identification code, such switching can be automatically achieved, so that the user/viewer need not participate in the optimization each time such a switching takes place.

Generally speaking, the color reproduction of a domestic television set has the white point shifted toward higher temperature, compared with personal computers, and is also brighter. Taking this in consideration, apart from the switching based on the still picture/moving picture identification code, automatic adjustment can be made in accordance with the tag data representing the white point and/or brightness.

When the tag data include parameters for image processing, it is not necessary to determine the content of the image processing from the characteristic of the color space, but the processing can be conducted using the parameters contained in the tag data, without the need to modify the parameters, and the burden on the image output device can be alleviated.

It may be so arranged that said tag data include a combination of said primary coordinates and said tone characteristics, or said tone characteristics include a gamma value for said first color space and table values for tone conversion, or said color reproduction characteristics include one of RGB signal levels for specific colors or a combination of hue, chroma and value coordinates.

With the above arrangement, when the tag data are a combination of the primary coordinates (chromaticity) and the tone characteristics, it is possible to express various color spaces clearly. When the tone characteristics include a gamma value for the first color space and table values for tone conversion, it is possible to realize any desired tone characteristics by tone conversion using the table values. Accordingly, it is only necessary to set the table values in the image output device, and the burden on the image output device can be alleviated. Moreover, when the color reproduction characteristics include RGB signal levels for specific colors, it is possible to express the color reproduction characteristics using the RGB signal levels, which are information which can be easily handled by hardware. When the color reproduction characteristics include a combination of hue, chroma and value coordinates, it is possible to express by means of information which is close to the human perception.

It may be so arranged that said hue, chroma and value coordinates are expressed in absolute magnitudes or relative magnitudes.

With the above arrangement, when the hue, chroma and value coordinates are expressed in absolute magnitudes, it is possible to specify the hue, chroma and value coordinates regardless of the characteristics of the image output device. When the hue, chroma and value coordinates are expressed in relative magnitudes, it is possible to specify the hue, chroma and value coordinates by the differences from the characteristics of the image output device, and the image output device needs only to vary the characteristics by the amount corresponding to the given value.

The method may further comprises:

monitoring the presence of tag data, representing parameters of a color space, over said communication channel along with said image data;

presuming, if no tag data is received over said communication channel, that said first color space is a default color space; and said output device converting said original image data into said second color space based upon the presumption that said first color space is said default color space to produce converted image data.

With the above arrangement, the output device performs the conversion based upon the presumption that the first color space is the default color space, if no tag data is received along with the image data, so that the color space conversion can be achieved properly.

According to another aspect of the invention, there is provided a method of outputting original image data that was generated relative to a first color space by an output device that converts image data of a second color space to a visually-perceptible analog thereof, the method comprising:

receiving from a provider, over a communication channel, original image data that was generated according to a first color space;

monitoring the presence of tag data, representing parameters of a color space, over said communication channel along with said image data;

presuming, if no tag data is received over said communication channel, that said first color space is a default color space;

said output device converting said original image data into said second color space based upon the presumption that said first color space is said default color space to produce converted image data; and said output device converting said converted image data into a visually-perceptible analog thereof.

With the above arrangement, the output device performs the conversion based upon the presumption that the first color space is the default color space, if no tag data is received along with the image data, so that the color space conversion can be achieved properly.

It may be so arranged that said provider includes a computing device and said communication channel includes a direct connection between said computing device and said output device, or said provider includes a memory device and said communication channel includes a direct connection between said memory device and said output device, or said provider includes a server and said communication channel includes a network to which said output device is connected.

It may be so arranged that said output device includes a component of a personal computing device connected to said network.

In this case, said network connection may be wireless.

It may be so arranged that said provider receives said original image data from a source.

In this case, said source may include a scanner, a digital still camera, a video camera or a signal generator.

It may be so arranged that said output device includes a monitor, a projector or a printer.

It may be so arranged that said default color space is standard RGB (sRGB).

With the above arrangement, the default color space is standard RGB (sRGB), so that it is not necessary to append the tag data to the image data according to sRGB which is a color space of an international standard, and which frequently appears.

The method may further comprises:

said output device retrieving data representing parameters of said default color pace, wherein said parameters include a code identifying a color space, primary coordinates, white point, brightness, tone characteristics, color reproduction characteristics, still picture/moving picture identification code, or parameters for image processing.

The still picture/moving picture identification code may be a code indicating that the image is supplied from a digital still camera (indicating that the image is a still picture), a code indicating that the image is supplied from a scanner (indicating that the image is a still picture), a code indicating that the image is supplied from a video camera (indicating that the image is a moving picture), or a code indicating that the image is supplied from a DVD.

With the above arrangement, the tag data can specify the characteristic of the color space, or the contents of the image processing that should be performed according to the output characteristic. When the tag data include a code identifying (indicating) a color space, it is possible to express the characteristic of the color space with a small number of data. When the tag data include primary coordinates (primary chromaticity), tone characteristic, or color reproduction characteristic, it is possible to express various color spaces flexibly, not being limited to a predefined color space.

Furthermore, for user/viewers accustomed to color reproduction of domestic television sets, it is desirable to switch the color reproduction between still pictures and moving pictures. By using the still picture/moving picture identification code, such switching can be automatically achieved, so that the user/viewer need not participate in the optimization each time such a switching takes place.

Generally speaking, the color reproduction of a domestic television set has the white point shifted toward higher temperature, compared with personal computers, and is also brighter. Taking this in consideration, apart from the switching based on the still picture/moving picture identification code, automatic adjustment can be made in accordance with the tag data representing the white point and/or brightness.

When the tag data include parameters for image processing, it is not necessary to determine the content of the image processing from the characteristic of the color space, but the processing can be conducted using the parameters contained in the tag data, without the need to modify the parameters, and the burden on the image output device can be alleviated.

It may be so arranged that said parameters include a combination of said primary coordinates and said tone characteristics, or wherein said tone characteristics include a gamma value for said first color space and table values for tone conversion, or said color reproduction characteristics include one of RGB signal levels for specific colors or a combination of hue, chroma and value coordinates.

With the above arrangement, when the tag data are a combination of the primary coordinates (chromaticity) and the tone characteristics, it is possible to express various color spaces clearly. When the tone characteristics include a gamma value for the first color space and table values for tone conversion, it is possible to realize any desired tone characteristics by tone conversion using the table values. Accordingly, it is only necessary to set the table values in the image output device, and the burden on the image output device can be alleviated. Moreover, when the color reproduction characteristics include RGB signal levels for specific colors, it is possible to express the color reproduction characteristics using the RGB signal levels, which are information which can be easily handled by hardware. When the color reproduction characteristics include a combination of hue, chroma and value coordinates, it is possible to express by means of information which is close to the human perception.

It may be so arranged that said hue, chroma and value coordinates are expressed in absolute magnitudes or relative magnitudes.

With the above arrangement, when the hue, chroma and value coordinates are expressed in absolute magnitudes, it is possible to specify the hue, chroma and value coordinates regardless of the characteristics of the image output device. When the hue, chroma and value coordinates are expressed in relative magnitudes, it is possible to specify the hue, chroma and value coordinates by the differences from the characteristics of the image output device, and the image output device needs only to vary the characteristics by the amount corresponding to the given value.

It may be so arranged that said output device is a display device capable of displaying an image obtained by conversion from the original image data, in a display area forming part of a display screen of the display device; and said display device generates color space conversion parameters for the display area, based on the tag data associated with the original image data and area data representing the display area, and converts the original image data into the image data of the second color space representing the image displayed in the display area, based on the generated color conversion parameters.

With the above arrangement, when the original image is displayed in a display area forming part of the display screen of the display device, the original image is CS-converted using the CS conversion parameters generated based on the tag data associated with the original image, and displayed in the display area, so that optimum CS conversion can be achieved for the image within the display area.

It may be so arranged that said display device is capable of displaying an image obtained by conversion from second original data generated according to a third color space, in a second display area forming another part of the display screen of the display device, said method further comprising:

receiving the second original image data over a communication channel from said provider;

receiving, from said provider, over said communication channel along with said second original image data, second tag data representing parameters of the third color space;

wherein said display device generates color space conversion parameters for the second area based on second area data representing the second display area, and also based on said second tag data or on the presumption that the third color space is the default color space, and converts the second original image data into the image data of the second color space representing the image displayed in the second display area.

With the above arrangement, when a plurality of original images are displayed in different display areas, the respective images can be CS-converted using CS conversion parameters optimum for each of the images.

It may be so arranged that said display device is capable of displaying third original image data in part of the display screen outside of the display area, and said display device generates color space conversion parameters for the outside of the display area, and converts the third original image data into the image data of the second color space representing the image displayed outside of the display area.

With the above arrangement, the image to be displayed outside of the display area is CS-converted using CS conversion parameters determined separately from the image to be displayed within the display area, so that optimum CS conversion can be made for each of the image displayed within the display area and the image displayed outside of the display area.

According to a further aspect of the invention, there is provided an image processing system, having an output device that converts image data of a second color space to a visually-perceptible analog of said image data, to output original image data that was generated relative to a first color space, the apparatus comprising:

a provider of image data;

a communication channel; and an output device that converts image data of a second color space to a visually-perceptible analog thereof;

said output device being operable to receive said original image data, that was generated according to a first color space, from said provider over said communication channel;

said output device being operable to receive, along with said image data, tag data representing parameters of said first color space from said provider over said communication channel;

said output device being operable to convert said original image data relative to said first color space according to said tag data to produce converted image data; and said output device being operable to convert said converted image data into a visually-perceptible analog thereof.

With the above arrangement, the output device performs color space (CS) conversion based on the tag data, so that it is not necessary for a separate device, such as a CPU of a personal computer connected to the output device, for controlling the output device to perform the conversion of the image data from the first color space to a second color space. For this reason, it is possible to display moving pictures at a speed at which devices in the background art could not. In addition, since the tag data is sent to the output device, and conversion is automatically performed based on the tag data sent to the output device, it is not necessary for the viewer/user to optimize the settings of the output device each time the color space of the input image data changes.

Moreover, since the output devices can perform the color space conversion, a device, such as a personal computer, for controlling the output devices can drive a plurality of output devices (that are designed to different color spaces), and yet the plurality of output devices, such a monitor and a printer, can convert the image data into visually perceptible analogs thereof concurrently in real time.

Furthermore, a device, such as a CPU of a personal computer, for controlling the output device may be made independent of the output device. In other words, the transfer of image data by a CPU to an output device can take place in an object-oriented manner, i.e., without the need for the CPU to adapt the image data to particulars of the output device. Conversely, output devices according to the invention achieve independence from the image data sources. That is, the output device can output image data from any color space without the need to receive image data converted to the color space of the output device.

It may be so arranged that
said provider includes a computing device and said communication channel includes a direct connection between said computing device and said output device, or
said provider includes a memory device and said communication channel includes a direct connection between said memory device and said output device; or
said provider includes a server and said communication channel includes a network to which said output device is connected.

It may be so arranged that said output device includes a component of a personal computing device connected to said network.

In this case, said network connection may be wireless.

It may be so arranged that said provider receives said original image data from a source.

In this case, said source may include a scanner, a digital still camera, a video camera or a signal generator.

It may be so arranged that said output device includes a monitor, a projector or a printer.

It may be so arranged that said output device is a first output device and said converted image data is first converted image data, the image processing system having at least a second output device that converts image data of a third color space to a visually-perceptible analog of said image data; and wherein
said provider is operable to transmit said original image data to said second output device;
said provider is operable to transmit said tag data along with said original image data to said second output device; and
said second output device is operable to convert said original image data relative to said first color space according to said tag data to produce second converted image data; and
said second output device is operable to convert said second converted image data into a visually-perceptible analog substantially simultaneously with said first output device converting said first converted image data into a visually-perceptible analog thereof.

With the above arrangement, two output devices which convert image data of different color spaces into visually perceptible analogs thereof can perform color conversion from image data from the same source concurrently and in real time.

It may be so arranged that said first output device includes a default monitor for said image processing system and said second output device includes an auxiliary monitor.

In this case, said auxiliary monitor may include a projector device.

It may be so arranged that
said output device is operable to monitor the presence of tag data, representing parameters of a color space, over said communication channel along with said image data;
said output device is operable to presume, if no tag-data is received over said communication channel, said first color space as being a default color space; and
said output device being operable to convert said original image data relative to said first color space based upon the presumption that said first color space is said default color space to produce converted image data.

With the above arrangement, the output device performs the conversion based upon the presumption that the first color space is the default color space, if no tag data is received along with the image data, so that the color space conversion can be achieved properly.

According to a further aspect of the invention, there is provided an image processing system, having an output device that converts image data of a second color space to a visually-perceptible analog of said image data, to output original image data that was generated relative to a first color space, the apparatus comprising:
a provider of image data;
a communication channel; and
an output device that converts image data of a second color space to a visually-perceptible analog thereof;
said output device being operable to receive said original image data, that was generated according to a first color space, from said provider over said communication channel;
said output device being operable to monitor the presence of tag data, representing parameters of a color space, over said communication channel along with said image data;
said output device being operable to presume, if no tag data is received over said communication channel, said first color space as being a default color space;
said output device being operable to convert said original image data relative to said first color space based upon the presumption that said first color space is said default color space to produce converted image data; and
said output device being operable to convert said converted image data into a visually-perceptible analog thereof.

With the above arrangement, the output device performs the conversion based upon the presumption that the first color space is the default color space, if no tag data is received along with the image data, so that the color space conversion can be achieved properly.

It may be so arranged that
said provider includes a computing device and said communication channel includes a direct connection between said computing device and said output device, or
said provider includes a memory device and said communication channel includes a direct connection between said memory device and said output device; or said provider includes a server and said communication channel includes a network to which said output device is connected.

It may be so arranged that said output device includes a component of a personal computing device connected to said network.

In this case, said network connection may be wireless.

It may be so arranged that said provider receives said original image data from a source.

In this case, said source may include a scanner, a digital still camera, a video camera or a signal generator.

It may be so arranged that said output device includes a monitor, a projector or a printer.

It may be so arranged that said output device is a first output device and said converted image data is first converted image data, the image processing system having at least a second output device that converts image data of a third color space to a visually-perceptible analog of said image data; and wherein said provider is operable to transmit said original image data to said second output device;

said provider is operable to transmit said tag data along with said original image data to said second output device; and said second output device is operable to convert said original image data relative to said first color space according to said tag data to produce second converted image data; and said second output device is operable to convert said second converted image data into a visually-perceptible analog substantially simultaneously with said first output device converting said first converted image data into a visually-perceptible analog thereof.

With the above arrangement, two output devices which convert image data of different color spaces into visually perceptible analogs thereof can perform color conversion from image data from the same source concurrently and in real time.

It may be so arranged that said first output device includes a default monitor for said image processing system and said second output device includes an auxiliary monitor.

In this case, said auxiliary monitor may include a projector device.

It may be so arranged that said default color space is standard RGB (sRGB).

It may be so arranged that said output device is a display device capable of displaying an image obtained by conversion from the original image data, in a display area forming part of a display screen of the display device; and said display device includes:
a parameter generating unit generating color space conversion parameters for the display area, based on the tag data associated with the original image data and area data representing the display area, and
a processing unit converting the original image data into the image data of the second color space representing the image displayed in the display area, based on the generated color space conversion parameters.

With the above arrangement, when the original image is displayed in a display area forming part of the display screen of the display device, the original image is CS-converted using the CS conversion parameters generated based on the tag data associated with the original image, and displayed in the display area, so that optimum CS conversion can be achieved for the image within the display area.

It may be so arranged that said display device is capable of displaying an image obtained by conversion from second original data generated according to a fourth color space, in a second display area forming another part of the display screen of the display device, said provider supplies the second original image data;

said display device receives said second original image data over the communication channel from said provider;

said display devices receives, from said provider, over said communication channel along with said second original image data, second tag data representing parameters of the fourth color space;

wherein said parameter generating unit generates color space conversion parameters for the second area based on second area data representing the second display area, and also based on said second tag data or on the presumption that the fourth color space is the default color space, and said processing unit converts the second original image data into the image data of the second color space representing the image displayed in the second display area.

With the above arrangement, when a plurality of original images are displayed in different display areas, the respective images can be CS-converted using CS conversion parameters optimum for each of the images.

It may be so arranged that said display device is capable of displaying third original image data in part of the display screen outside of the display area, and said parameter generating unit generates color space conversion parameters for the outside of the display area, and said processing unit converts the third original image data into the image data of the second color space representing the image displayed outside of the display area.

With the above arrangement, the image to be displayed outside of the display area is CS-converted using CS conversion parameters determined separately from the image to be displayed within the display area, so that optimum CS conversion can be made for each of the image displayed within the display area and the image displayed outside of the display area.

Further advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention.

The drawings are not drawn to scale.

DETAILED DESCRIPTION OF THE PREFERRED EMBODIMENTS

Figure 2:
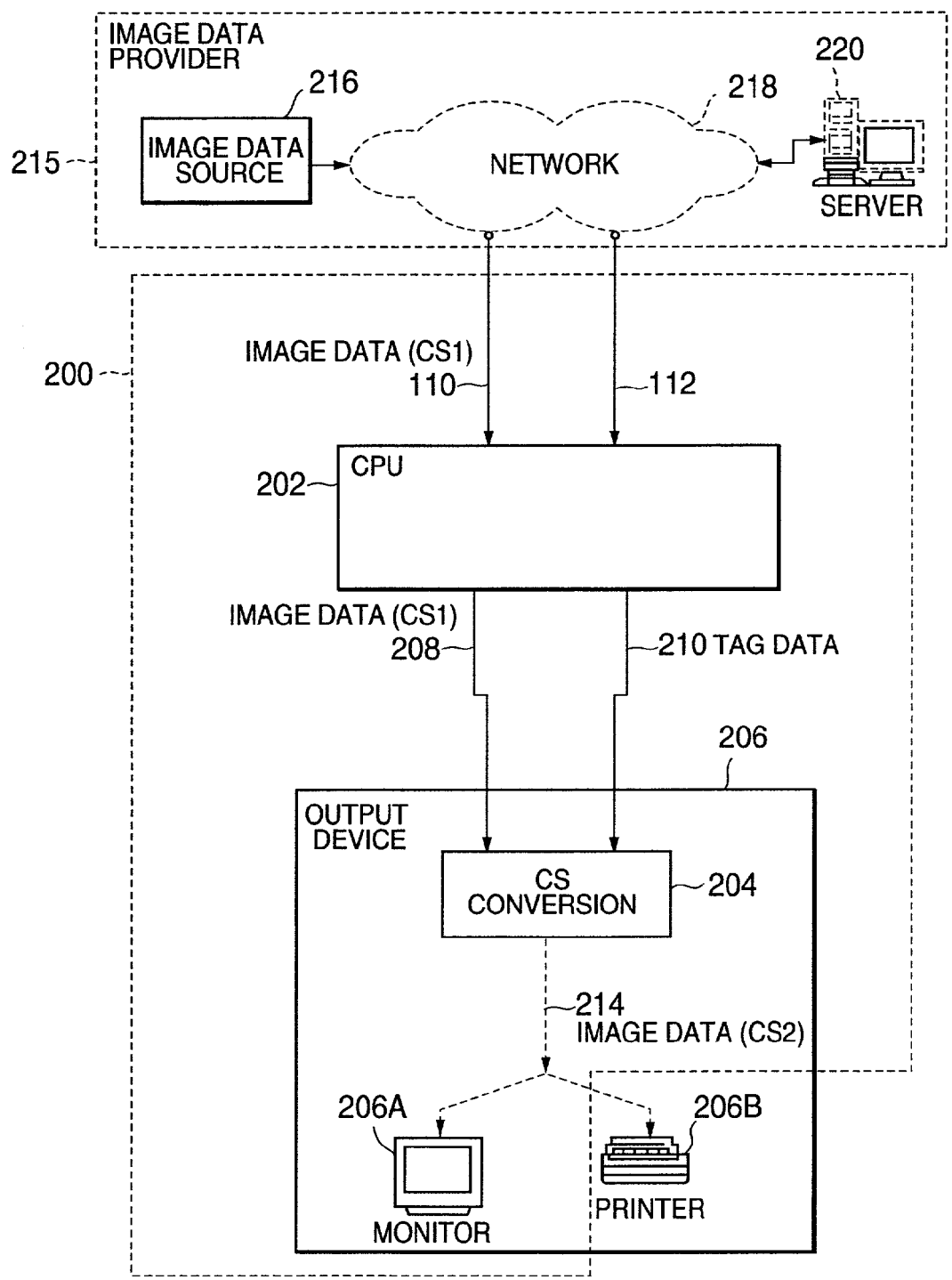
FIG. 2 depicts a block diagram of a first embodiment of a computer system according to the invention.

FIG. 2 depicts a block diagram of a first embodiment of a computer system constituting an image processing system according to the invention. In FIG. 2, a computing device, such as a personal computer (PC) 200, includes a CPU 202 and an output device 206. FIG. 2 also depicts an image data provider 215 that includes a source 216 of image data, optionally connected to the CPU 202 via a network 218 run by a server 220 (the network 218 and the server 220 being drawn in dashed lines to denote their optional status). The source 216 of image data can be, e.g., a scanner, a digital still camera a video camera or a signal generator (e.g., a computing device programmed with software, such as paint, photo, graphics or animation software).

The image data provider 215 is connected to the CPU 202 via signal paths 110 and 112. The CPU 202 is connected to the CS conversion module 204 via signal paths 208 and 210.

Figure 1:
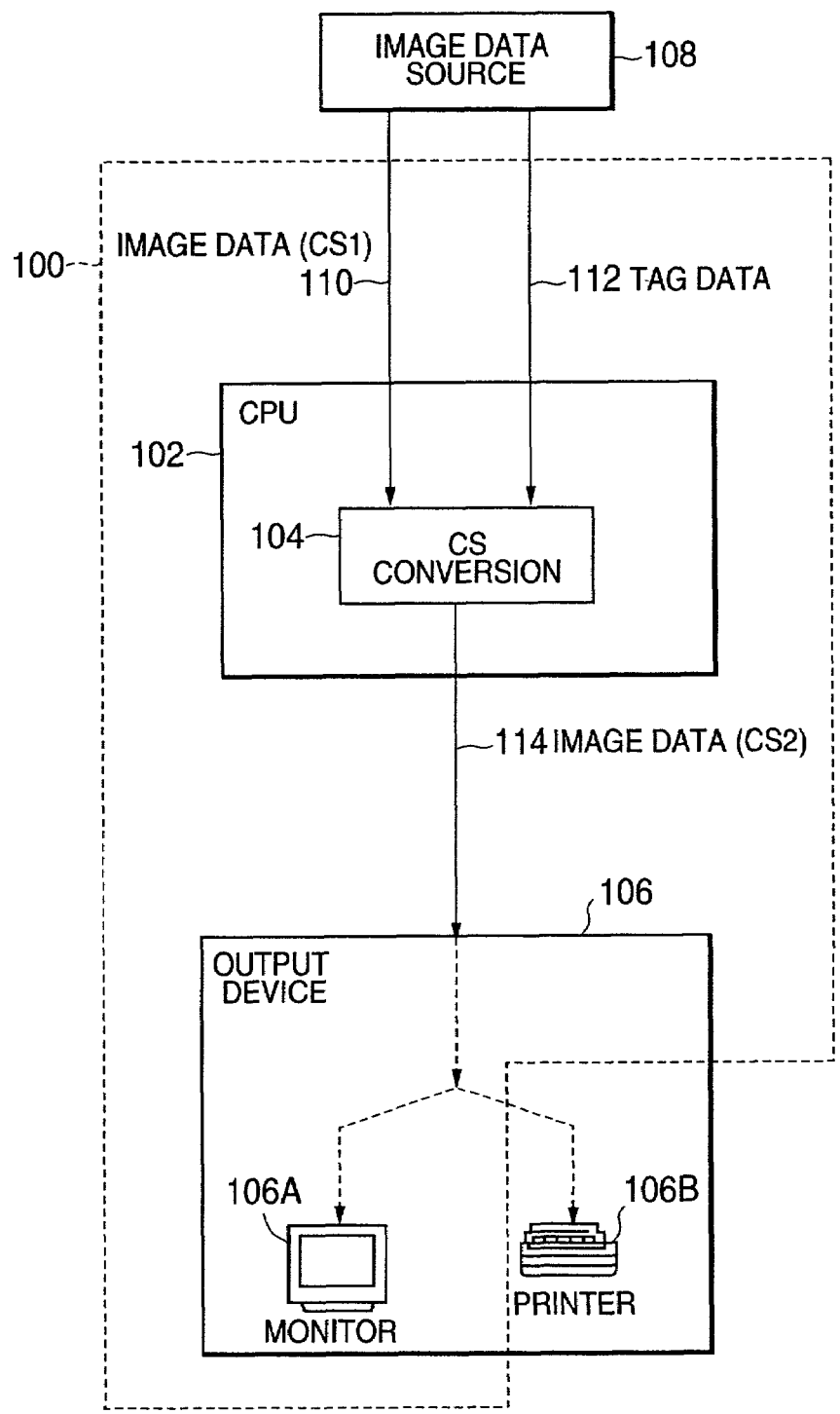
FIG. 1 depicts a block diagram of a personal computer system according to the Background Art.

The output device 206, not the CPU 202 (as in the Background Art of FIG. 1), has a color space (CS) conversion module 204 that performs the function of converting image data from a first color space to a second color space. The CS conversion module 204 corresponds to the CS conversion module 506 of FIG. 5 (which is depicted in more detail); the CS conversion module 506 is discussed in more detail below.

The output device 206 is depicted as including a converter to convert image data into a visually-perceptible analog thereof (corresponding display, print, or the like), such as a monitor 206A that can be a component of the PC or a printer 206B that can be external to the PC. The CS conversion module 204 is connected to the converter 206A and/or 206B via signal path 214.

Each of the monitor 206A and the printer 206B, as well as the CS conversion module 204, are considered external to the CPU 202. The monitor 206A can be a cathode ray tube (CRT), a liquid crystal display (LCD) device, a plasma display panel (PDP), an LCD projector, etc. The printer 206B can be a laser printer, an ink jet printer, a dot matrix printer, a thermal printer, a plotter, etc.

Separate signal paths 208 and 210 for the image data and the associated tag data, respectively, have been depicted to emphasize that the tag data is transferred to the CS conversion module 204, while, in contrast, the signal path 214 conveys only CS2 image data to the converters 206A and/or 206B. Similar conventions have been employed in the other figures. But it is not necessary that the image data and tag data be transmitted over two separate paths. Rather, the number of signal paths will depend upon the application in which the invention is employed.

Figure 3:
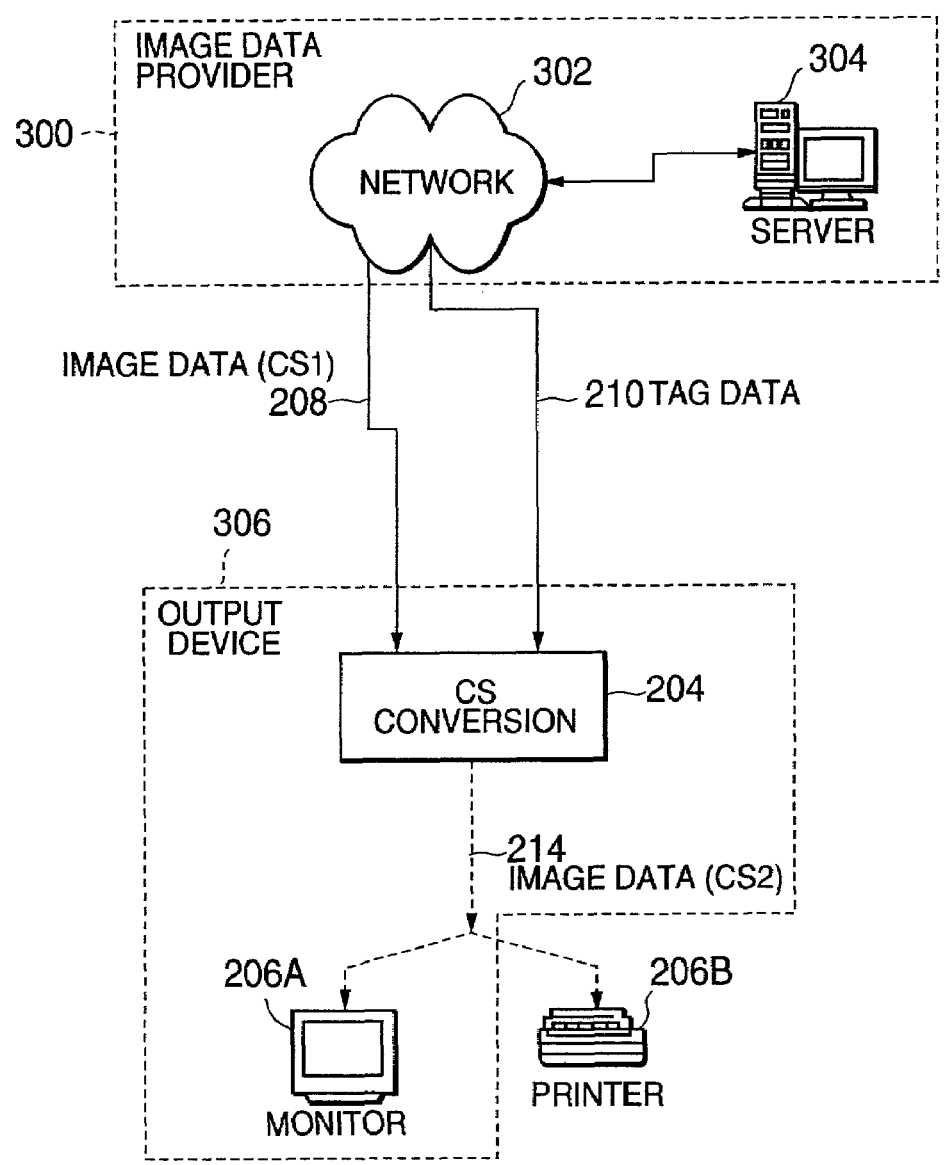
FIG. 3 depicts a block diagram of a second embodiment of a computer system according to the invention.

FIG. 3 depicts a block diagram of a second embodiment of a computer system according to the invention. The differences between FIG. 3 and FIG. 2 will be emphasized. In FIG. 3, the image data provider 300 can be a network 302 run by a server 304. A network-compatible output device 306, having a CS conversion module 204, is connected to the network 302 via the signal paths 208 and 210.

Figure 4:
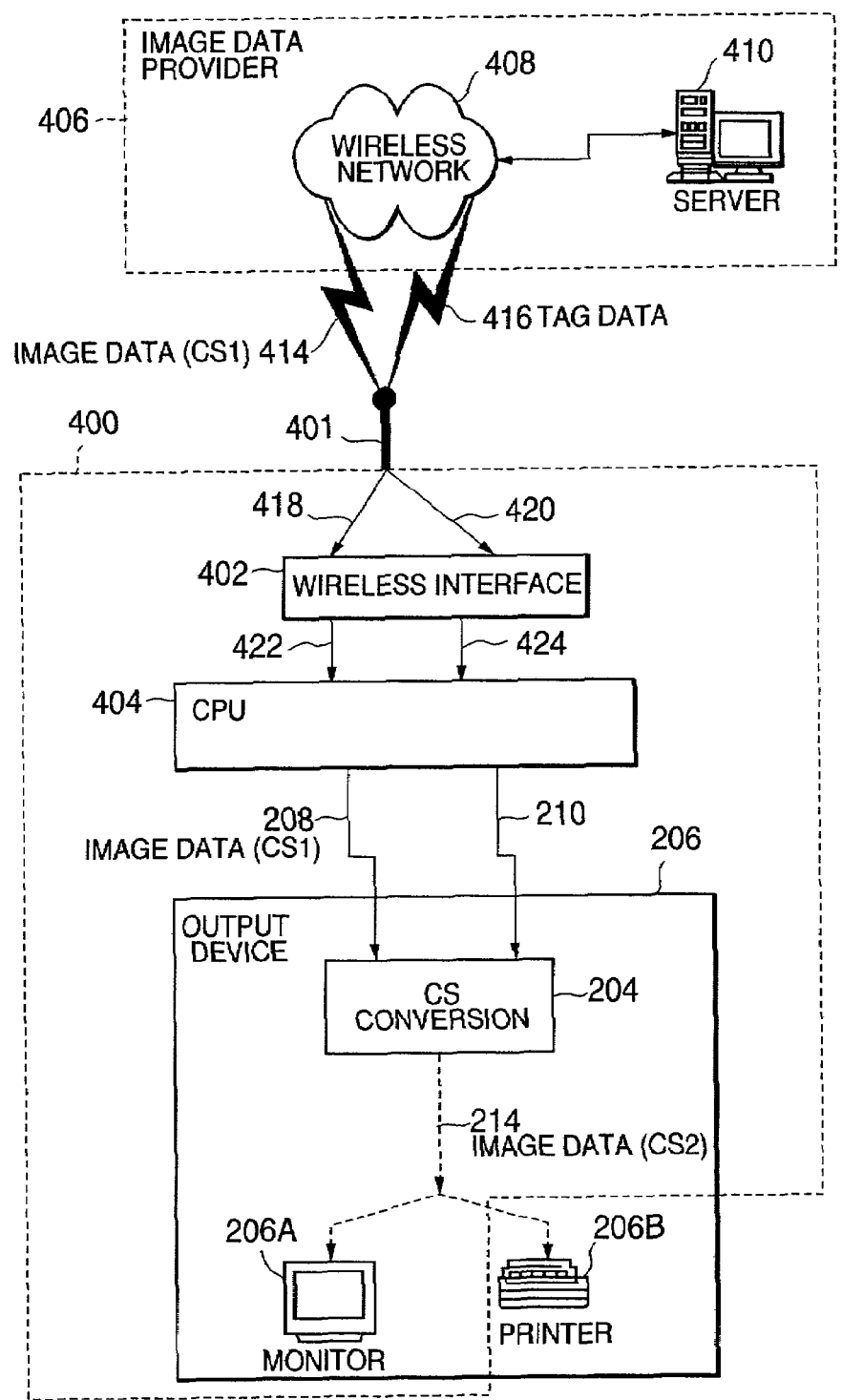
FIG. 4 depicts a block diagram of a third embodiment of a computer system according to the invention.

FIG. 4 depicts a block diagram of a third embodiment of a computer system according to the invention. The differences between FIG. 4 and FIG. 2 will be emphasized. In FIG. 4, the image data provider 406 can be a wireless network 408 run by a server 410. And the computing device 400 (e.g., a personal data assistant (PDA)) includes an antenna 401, a wireless interface 402 and a CPU 404.

In FIG. 4, the antenna 401 of the computing device 400 is connected to the image data provider 406 via the wireless signal paths 414 and 416. The wireless interface 402 is connected to the antenna 401 via the signal paths 418 and 420. The wireless interface 402 is connected to the CPU via the signal paths 422 and 424. The CPU 404 is connected to the CS conversion unit 204 via the signal paths 208 and 210. The CS conversion unit is connected to the converter 206A and/or and 206B via the signal path 214.

Figure 5:
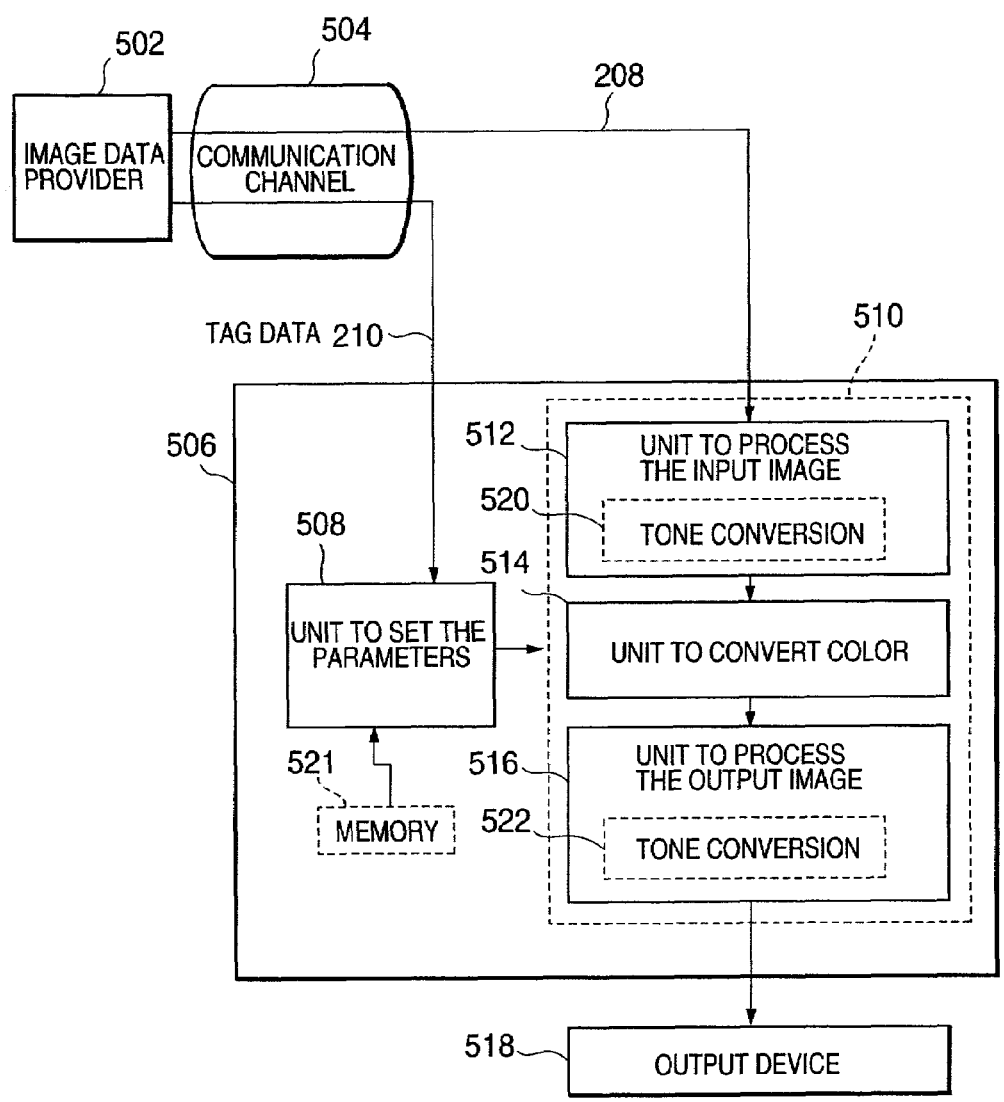
FIG. 5 depicts a color conversion module according to the invention in more detail.

FIG. 5 depicts, in more detail, a CS conversion module 506 used in the first to third embodiments, as well as in the fourth and fifth embodiments, to be described later. The CS conversion module 506 corresponds to the CS conversion module 204. In FIG. 5, an image data provider 502 is connected to the CS conversion module 506 via a communication channel 504 through which travel signal paths 208 and 210.

The CS conversion module 506 includes a unit 510 to process the image data, the processed image data being output to an output device 518 (corresponding to the various embodiments 206 and 306 of output devices discussed above). The CS conversion module 506 also includes unit 508 to set the parameters for the processing unit 510 and an optional memory device 521 (denoted by depiction in dashed lines), e.g., a ROM, connected to the unit 508. The processing unit 510 includes: a unit 512 to process the input image; a unit 514 to convert the color of the input image data; and a unit 516 to process the output image. The unit 512 includes a tone conversion module 520 to manipulate the tone of the input image. The unit 516 includes a tone conversion module 522 to manipulate the tone of the output image.

The units 508, 512, 514, and 516 are preferably hardware devices such as Programmable Logic Arrays (PLAs) or Application Specific Integrated Circuits (ASICs). And the units 508, 512, 514, and 516 are the subject of the following copending patent applications, the contents of each of which is hereby incorporated by reference: unit 508 is the subject of Japanese Patent Application Nos. Heisei 11-291896, Heisei 11-291897, Heisei 11-349716 and Heisei 11-349717; unit 512 is the subject of Japanese Patent Application Nos. Heisei 11-291892 and Heisei 11-291894; unit 514 is the subject of the parent of the parent to this case, namely U.S. patent application Ser. No. 09/457,703; and unit 516 is the subject of Japanese Patent Application Nos. Heisei 11-291893 and Heisei 11-291895.

Tag data representing parameters of a color space can take many forms, depending upon the particular details of the units 508, 510, 512, 514 and 516. Some examples of tag data follow. Tag data can be a code (e.g., 3 bits in length) identifying a type of color space such as sRGB, NTSC, PAL, SECAM, a proprietary standard used by a manufacturer of image generating equipment, etc. Tag data can be primaries' coordinates, e.g., R: (x, y)=(0.640, 0.330), G: (x, y)=(0.300, 0.600), B: (x, y)=(0.150, 0.060); or W: (x, y)=(0.3127, 0.3290), x, y: CIE (Commission Internationale de l'Éclairage) chromaticity coordinate.

Tag data can be tone characteristics, e.g., a gamma value such as gamma=1.8 or 2.2 or 2.6. Tag data can be a table of values for tone conversion, e.g., that describe a relationship between input signal level and output signal level, such as

| input | 10.0 | 0.1 | 0.2 | ... | 10.9 | 1.0 |
|---|---|---|---|---|---|---|
| output | 0.0 | 0.01 | 0.04 | ... | 0.81 | 1.00 |

Tag data can also be a combination of primaries' coordinates and tone characteristics.

Tag data can be color reproduction characteristics related to human perception, e.g.: RGB signal values for specific colors such as: Red, R=1.0, G=0.1, B=0.0; or Hue (similar to color phase), Chroma (similar to saturation), and Value (similar to brightness) coordinates for specific colors such as, in the case of absolute values, Red —Hue=5, Chroma=4, Value=14, or the case of relative values, Red —delta_H=0.1, delta_C=-0.01, delta_V=0.0. Tag data can also be parameters for processing unit 510, especially the tone conversion unit 520, the color conversion unit 514 and the tone conversion unit 522.

The tag data may be moving picture/still picture identification code, which may be one of those corresponding to the image sources such as digital still camera, scanner, video camera, television broadcasting, or DVD drive. In such cases, the digital still camera, and scanner are recognized as providing a still picture, while the video camera, television broadcasting and DVD drive are recognized as providing a moving picture. Needless to say, it is sufficient if indication of whether the image provided is a moving picture or a still picture is given. The image sources are not limited to those mentioned above.

Usually, the white point of the color reproduction of domestic television sets is shifted toward the higher color temperature, compared to that of personal computer systems. As a countermeasure thereof, the white point or the brightness may be automatically adjusted by means of the tag data, in addition to the above-mentioned switching according to the still picture/moving picture identification code.

Selection of the tag data among those listed above depends on the size of the memory needed for storing the tag data, and the intended object of the system. Also, a plurality of items of tag data may be used in combination.

Figure 6:
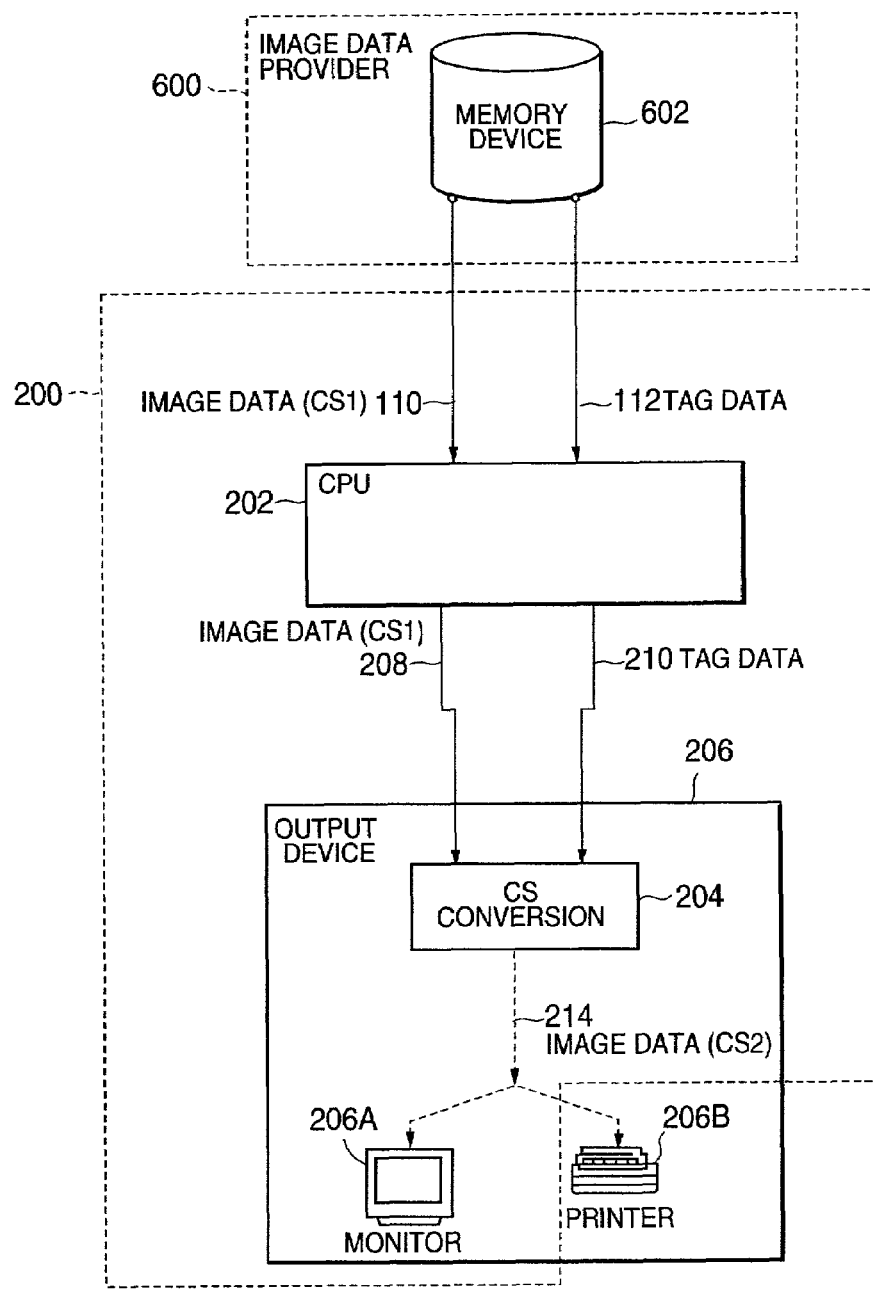
FIG. 6 depicts a block diagram of a fourth embodiment of a computer system according to the invention.

FIG. 6 depicts a block diagram of a fourth embodiment of a computer system according to the invention. The differences between FIG. 6 and FIG. 2 will be emphasized. In FIG. 6, the image data provider 600 can be a memory device 602 such as a Personal Computer Miniature Communications Interface Adapter (PCMCIA) memory card, a disk drive device or other memory device. The image data provider is connected to the CPU 202 via the signal paths 110 and 112. Again, the CPU 202 is connected to the CS conversion module 204 via the signal paths 208 and 210 while the CS conversion module is connected to the converter 206A and/or 206B via the signal path 214.

The operation of the first to fourth embodiments will now be discussed.

In FIG. 2, the image data provider 215 provides image data based in a first color space (CS1) and tag data representing parameters of the first color space via signal paths 110 and 112, respectively, to the CPU 202 of the PC 200. The CPU 202 transmits the CS1 image data and the tag data, without conversion (in contrast to Background Art FIG. 1), to the CS conversion module 204 within the output device 206 via signal paths 208 and 210, respectively. Then, the CS conversion module 204 automatically converts the CS1 image data from the first color space to the second color space (CS2), namely that of the converter 206A and/or 206B, according to the tag data for the first color space. And then the CS conversion module 204 outputs the image data, now based in the second color space, to the converter 206A and/or 206B via the signal path 214.

If the PC 200 has both a default monitor 206A and a printer 206 B, then each of the monitor 206A and the printer 206B can have its own CS conversion unit 204A and 204B, respectively (not depicted for simplicity). Similarly, if another output device 206i is provided (not depicted), it too will have its own CS conversion module 204i.

Similarly, in FIG. 5, the CS conversion module 506 automatically converts the CS1 image data from the image data provider 502 to the second color space (CS2) of the output device 518 according to the tag data for the first color space. And then the CS conversion module 506 outputs the image data, now based in the second color space, to the output device 518. For a more detailed description of the operations of the units 508, 510, 512, 514, and 516, the reader is generally referred to the copending applications that have been incorporated by reference above.

An alternative implementation of the CS conversion module 204 is provided with the optional memory device 521 depicted in FIG. 5. In this alternative implementation, the unit 508 (for setting parameters) monitors the signal path 210 for tag data. If none is received within a predetermined time relative to the transmission of the image data over the signal path 208, then the unit 508 presumes that the color space of the image data corresponds to a default color space. The memory device 521 contains parameters that are representative of the default color space. The unit 508 causes the default parameters in the memory device 522 to be transferred to the process unit 510. As an example, the default color space can be sRGB.

As a further alternative, instead of the tag data (representative of parameters of a color space) being transmitted to the unit 508 via the signal path 210, the parameters themselves for the color space could be transmitted to the unit 508 from the image data provider 502. But this alternative will consume a greater communication bandwidth.

In FIG. 3, the CS1 image data and associated tag data are transmitted by the image provider 300 over the signal paths 208 and 210, respectively, from the server 304 via the network 302. The output device 306 is capable of interfacing to the network 302. The operation of the CS conversion module 204, etc., remains substantially the same.

In FIG. 4, the data provider 406 transmits CS1 image data and its associated tag data over wireless signal paths 414 and 416, respectively, to the antenna 401 under control of the server 410 via the wireless network 408. The wireless interface 402 of the computing device 400 receives the CS1 image data and its associated tag data via the signal paths 418 and 420, respectively. The wireless interface 402 transfers the CS1 image data and its associated tag data to the CPU 404 via the signal paths 422 and 424, respectively. The CPU 404 transfers the CS1 image data and its associated tag data via the signal paths 208 and 210, respectively, to the CS conversion module 204 within the output device 206. Again, the operation of the CS conversion module 204, etc., remains substantially the same.

In FIG. 6, the image data provider 600, e.g., the memory device 602, provides image data based in a first color space (CS1) and tag data representing parameters of the first color space via signal paths 110 and 112, respectively, to the CPU 202 of the PC 200. The operation of the CPU 202, etc., remains substantially the same as in FIG. 2.

Figure 7:
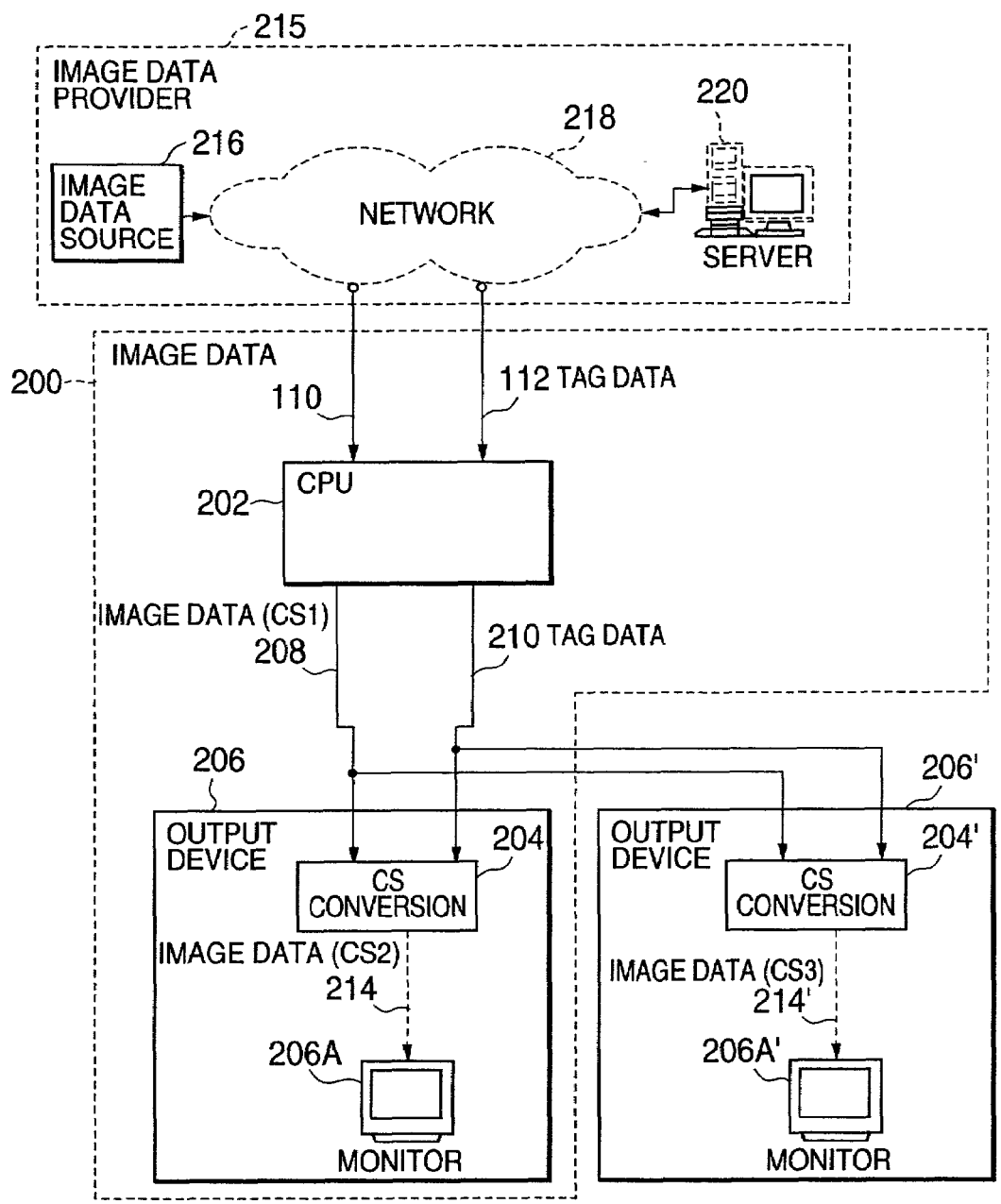
FIG. 7 depicts a block diagram of a fifth embodiment of a computer system according to the invention.

FIG. 7 is a block diagram showing a fifth embodiment of a computer system of the invention. The differences between FIG. 7 and FIG. 2 will be emphasized. In FIG. 7, two output devices 206 and 206' are provided. The first output device 206 includes a CS conversion module 204 and a converter, e.g., a default monitor 206A. The second output device 206' includes a CS conversion module 204' and a converter, e.g., an auxiliary monitor 206A' formed for example of a projector device.

The CPU 202 is connected via the signal paths 208 and 210 to the CS conversion module 204 in the output device 206, as in FIG. 2, and to the CS conversion module 204' in the output device 206'. The CS conversion module 204 is connected via the signal path 214 to the converter 206A, while the CS conversion module 204' is connected via the signal path 214' to the converter 206A'.

When the image data of the first color space (CS1) and its associated tag data representing the parameters of the first color space are received from the image data provider 215, the CPU 202 transfers the CS1 image data and its associated tag data via the signal paths 208 and 210, respectively, to the CS conversion module 204 in the output device 206, and to the CS conversion module 204' in the output device 206'. The CS conversion module 204 automatically converts the CS1 image data from the first color space to a second color space (CS2), i.e., the color space for the converter 206A, according to the tag data for the first color space. The CS conversion module 204 outputs the image data of the second color space (CS2) via the signal path 214 to the converter 206A. Substantially concurrently therewith, the CS conversion module 204' automatically converts the CS1 image data from the first color space to a third color space (CS3), i.e., the color space for the converter 206A', according to the tag data for the first color space. The CS conversion module 204' outputs the image data of the third color space (CS3) via the signal path 214' to the converter 206A'.

In the fifth embodiment, the converter in the second output device is a monitor. However, it may be any other type of converter, e.g., a printer. In the fifth embodiment, the number of output devices is two (206, and 206'). It may be more than two. The fifth embodiment is a modification of the second embodiment. Similar modification can be applied to the first, third and fourth embodiments.

The sixth to tenth embodiments described next are similar to the first to fourth embodiments, but differ from them in having a classification unit 702.

Figure 8:
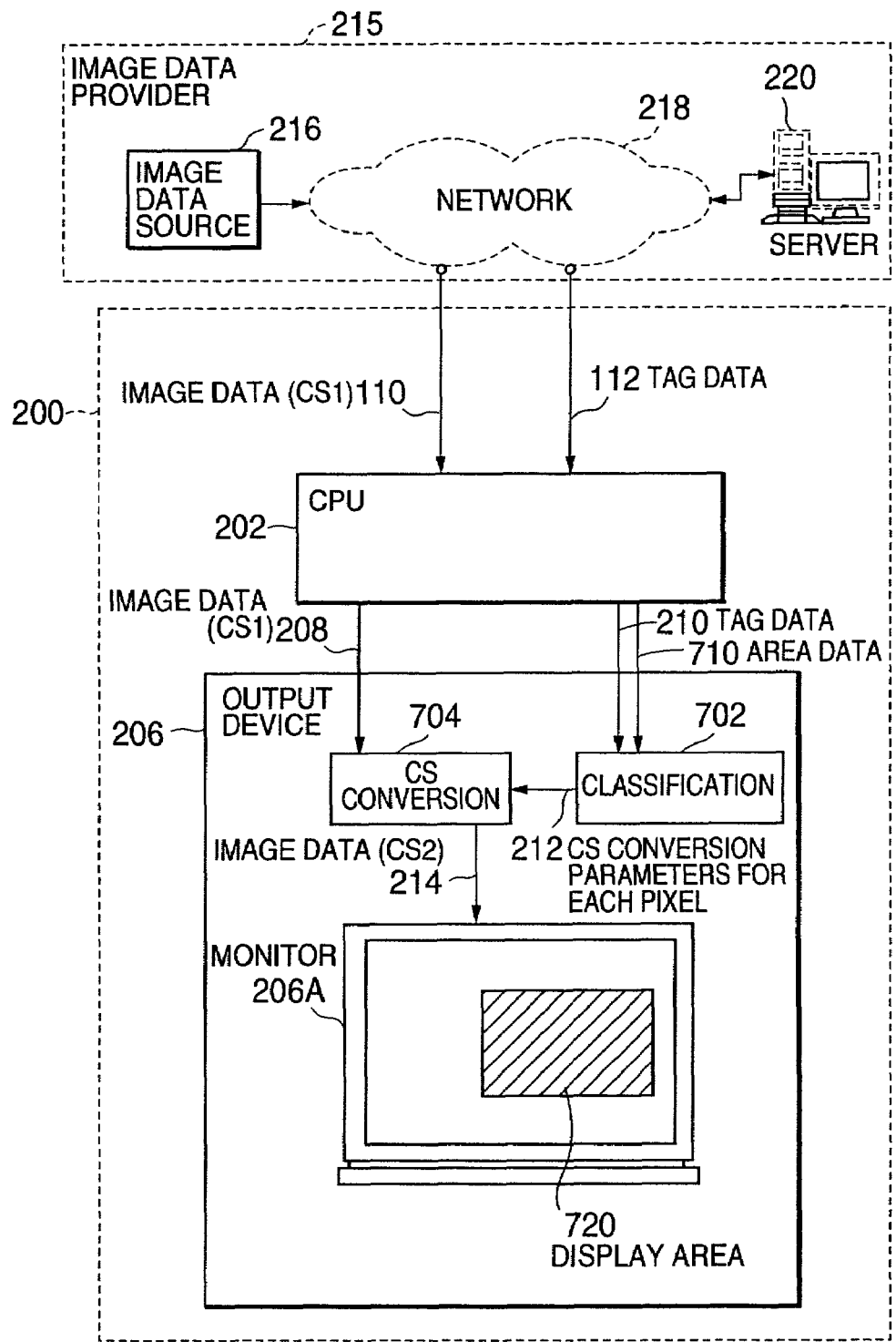
FIG. 8 depicts a block diagram of a sixth embodiment of a computer system according to the invention.

FIG. 8 depicts a block diagram of a sixth embodiment of a computer system constituting an image processing system according to the invention. The computer system of this embodiment is generally identical to the computer system of the first embodiment, but differs from it in the following respects. First, the output device 206 is provided with a classification unit 702. Secondly, the printer 206B is not provided. Furthermore, in place of the CS conversion module 204 of FIG. 2, a CS conversion module 704 is provided. The CS conversion module 704 is similar to the CS conversion module 204, but has the differences described later.

The output device 206 of this embodiment is a display device that can display an image obtained by converting the original image data (CS1) from the image data source 216, in a display area 720 forming part of the display screen of the monitor 206A, and display at least part of an image (not shown) separate from the above-mentioned original image, in the remaining part (part other than the display area 720) of the display screen, and the CPU 202 can generate area data 710 indicating the display area 720.

The display area 720 may be an area within the display screen, which is basically rectangular, and called a "window," and the area data 710 identifies the area, for displaying contents, such as an image, only within the area. The area data 710 may comprise data representing the coordinate values of one of the vertices and the lengths of the two sides of the rectangular area forming the window, or data representing the coordinate values of two vertices of the rectangular area, diagonally opposite to each other, or any other data which can identify the area in which the image after the CS conversion, to be described later, is to be displayed on the screen of the monitor 206A.

The CPU 202 is connected to the CS conversion module 704 via the signal path 208. The CPU 202 is also connected to the classification unit 702 via the signal path 210 and 710.

The classification unit 702 serves as a parameter generating unit which determines whether each pixel is within the display area 720 in accordance with the area data, and, based on the result of the determination and the tag data, generates CS conversion parameters for each of the pixels, for the inside and outside of the display area 720. When the same CS conversion parameters as those in the immediately preceding pixel are used, e.g., the pixels within the display device 720 are processed successively, or when the pixels outside of the display device 720 are processed successively, data to that effect, (i.e., indicating that the same CS conversion parameters can be used) may be outputted in place of the CS conversion parameters. It may-not be necessary to perform CS conversion (on the image inside of the display area 720, or the image outside of the display area 720), because for example the original data supplied is of the second color (CS2). In this case, it is assumed, by way of convenience of description, that CS conversion in which the result of the conversion is the same as the image data before conversion is performed.

The output of the classification unit 702 is connected to the CS conversion module 704 via a signal path 212.

The CS conversion module 704 performs the CS conversion based on the CS conversion parameters for each pixel. That is, the CS conversion module 704 converts the original image data supplied from the image data source 216 into the image data of the second color space (CS2) to be displayed in the display area 720, in accordance with the CS conversion parameters for the inside of the display area 720. In addition, the CS conversion module 704 converts the original image data for the part of the display screen outside of the display area 720 into the image data of the second color space (CS2) to be displayed outside of the display area 720, in accordance with the CS conversion parameters for the outside of the display area 720.

Figure 11:
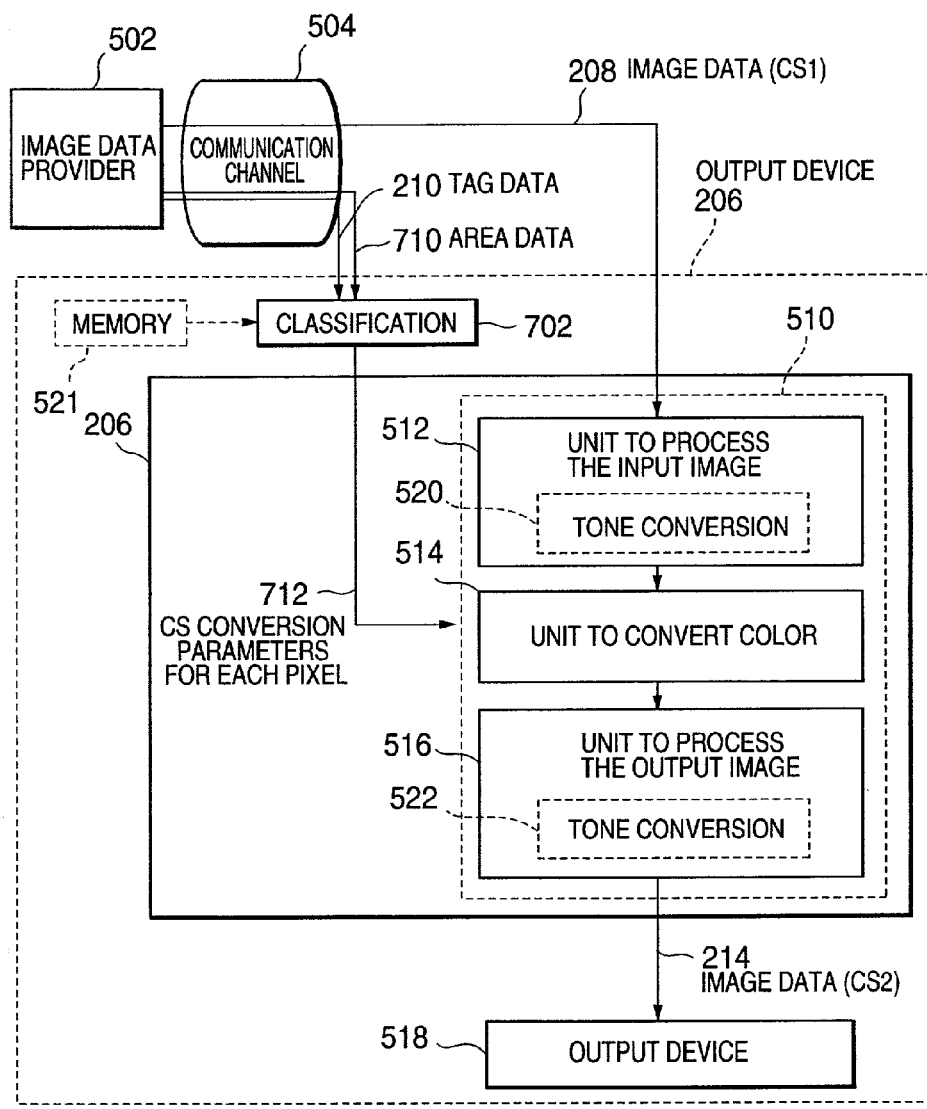
FIG. 11 depicts a color conversion module according to the invention in more detail.

The CS conversion module 704 corresponds to the CS conversion module 706 of FIG. 11 (shown in greater detail). The CS conversion module 706 is discussed in more detail below.

Separate signal paths 208, 210, and 710 for the image data and the associated tag data and the area data, respectively, have been depicted to emphasize that the image data, the tag data and the area data are transferred to the CS conversion module 704 and the classification unit 702. But it is not necessary that the image data, the tag data and the area data be transmitted over three separate paths. Rather, the number of signal paths will depend upon the application in which the invention is employed.

Figure 9:
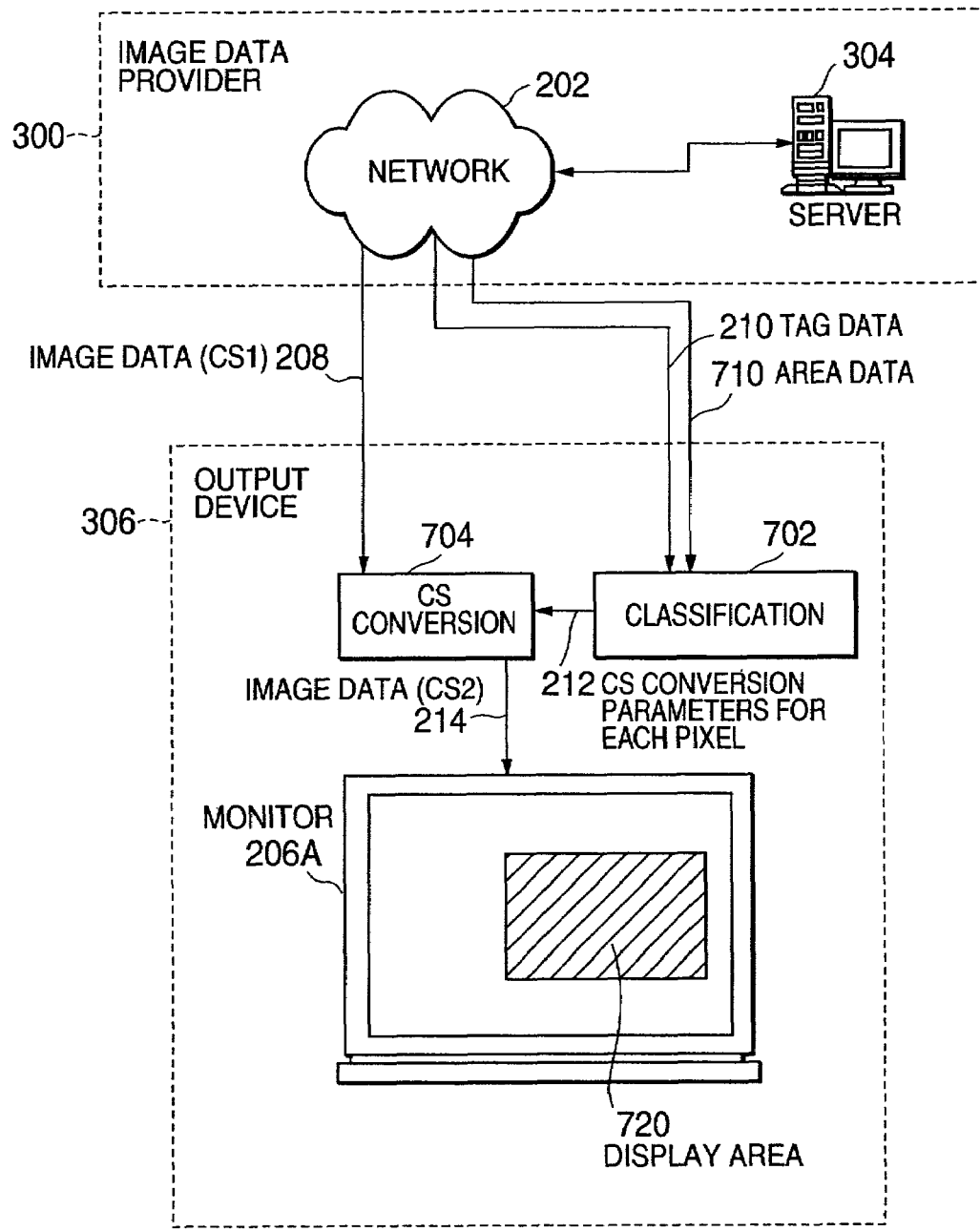
FIG. 9 depicts a block diagram of a seventh embodiment of a computer system according to the invention.

FIG. 9 depicts a block diagram of a seventh embodiment of a computer system according to the invention. The differences between FIG. 9 and FIG. 8 will be emphasized. In FIG. 9, the image data provider 300 can be a network 302 run by a server 304. A network-compatible output device 306, having a classification unit 702, and a CS conversion module 704, is connected to the network 302 via the signal paths 208, 210 and 710.

Figure 10:
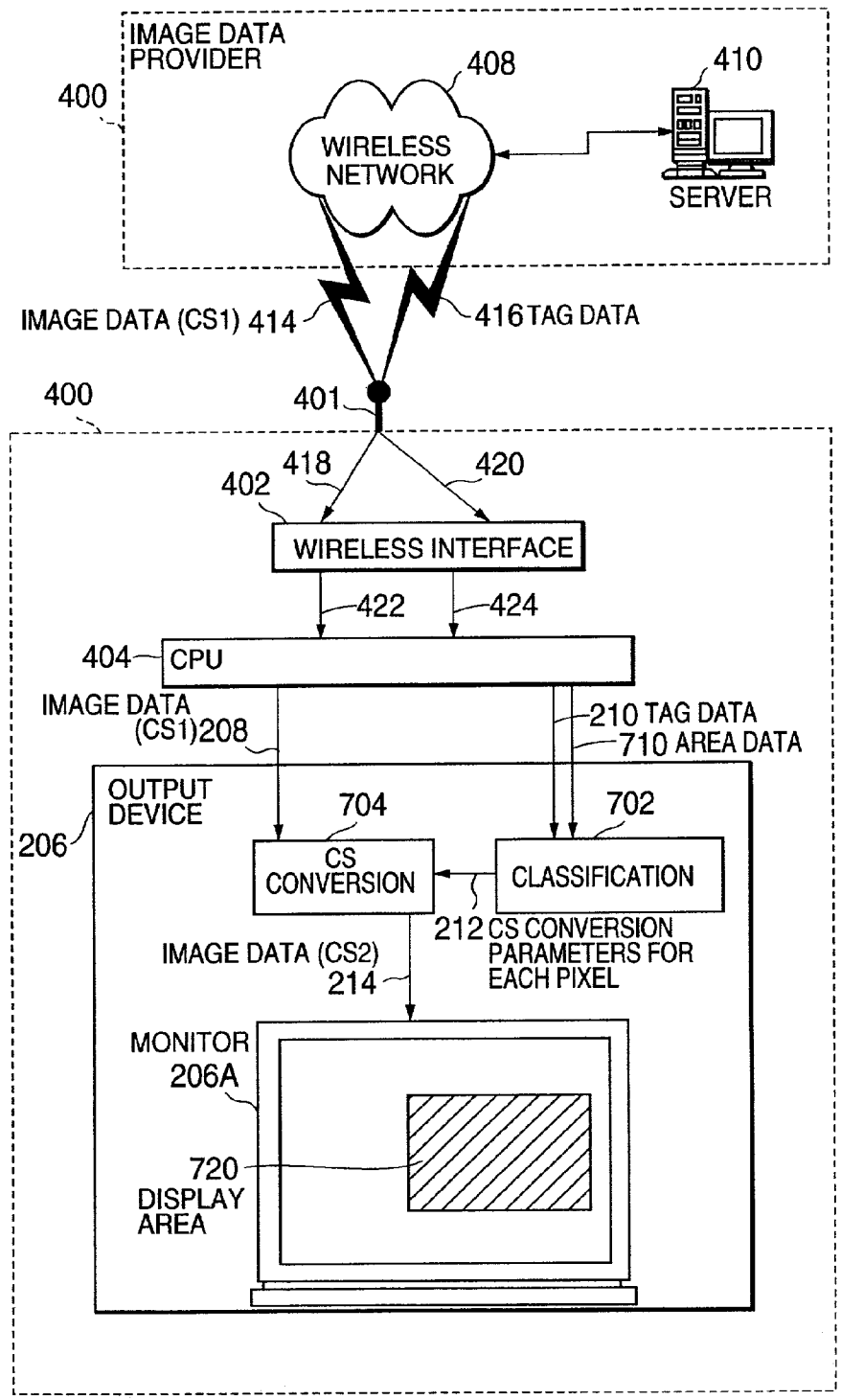
FIG. 10 depicts a block diagram of an eighth embodiment of a computer system according to the invention.

FIG. 10 depicts a block diagram of an eighth embodiment of a computer system according to the invention. The differences between FIG. 10 and FIG. 8 will be emphasized. In FIG. 10, the image data provider 406 can be a wireless network 408 run by a server 410. And the computing device 400 (e.g., a personal data assistant (PDA)) includes an antenna 401, a wireless interface 402 and a CPU 404.

In FIG. 10, the antenna 401 of the computing device 400 is connected to the image data provider 406 via the wireless signal paths 414 and 416. The wireless interface 402 is connected to the antenna 401 via the signal paths 418 and 420. The wireless interface 402 is connected to the CPU 404 via the signal paths 422 and 424. The CPU 404 is connected to the CS conversion unit 704 via the signal path 208. The CPU 404 is also connected to the classification unit 702 via the signal paths 210 and 710. The output of the classification unit 702 is connected to the CS conversion module 704 via the signal path 212. The CS conversion module 704 is connected to the monitor 206A via the signal path 214.

FIG. 11 depicts, in more detail, a CS conversion module 706 which is used in the sixth to eighth embodiments, as well as ninth embodiment and tenth embodiment to be described later. The CS conversion module 706 corresponds to the CS conversion module 704 in FIG. 8 to FIG. 10, as well as in FIG. 12 and FIG. 13, to be described later. In FIG. 11, an image data provider 502 is connected to the CS conversion module 706 and the classification unit 702 via a communication channel 504 through which travel signal paths 208, 210 and 710. The image data provider 502 is connected to the CS conversion module 706 via the signal path 208 within the communication channel 504, and to the classification unit 702 via the signal paths 210 and 710. The classification unit 702 is connected to the CS conversion module 706 via the signal path 712.

The output device 206 shown in FIG. 11 includes an optional memory device 521 (shown in dotted lines), such as a ROM, connected to the classification unit 702. In the example shown in FIG. 5, the memory device 521 is shown to be provided inside of the CS conversion module 506, but in the example of FIG. 11, the memory device 521 is provided outside of the CS conversion module 706.

The CS conversion module 706 includes a unit 510 to process the image data, the processed image data being output to an output device 518 (corresponding to the output device 206 discussed above).

The processing unit 510 is similar to that shown in FIG. 5, and includes: a unit 512 to process the input image; a unit 514 to convert the color of the input image data; and a unit 516 to process the output image. The unit 512 includes a tone conversion module 520 to manipulate the tone of the input image. The unit 516 includes a tone conversion module 522 to manipulate the tone of the output image.

The tag data representing the parameters of the color space may be those described in connection with the first to fifth embodiments.

Figure 12:
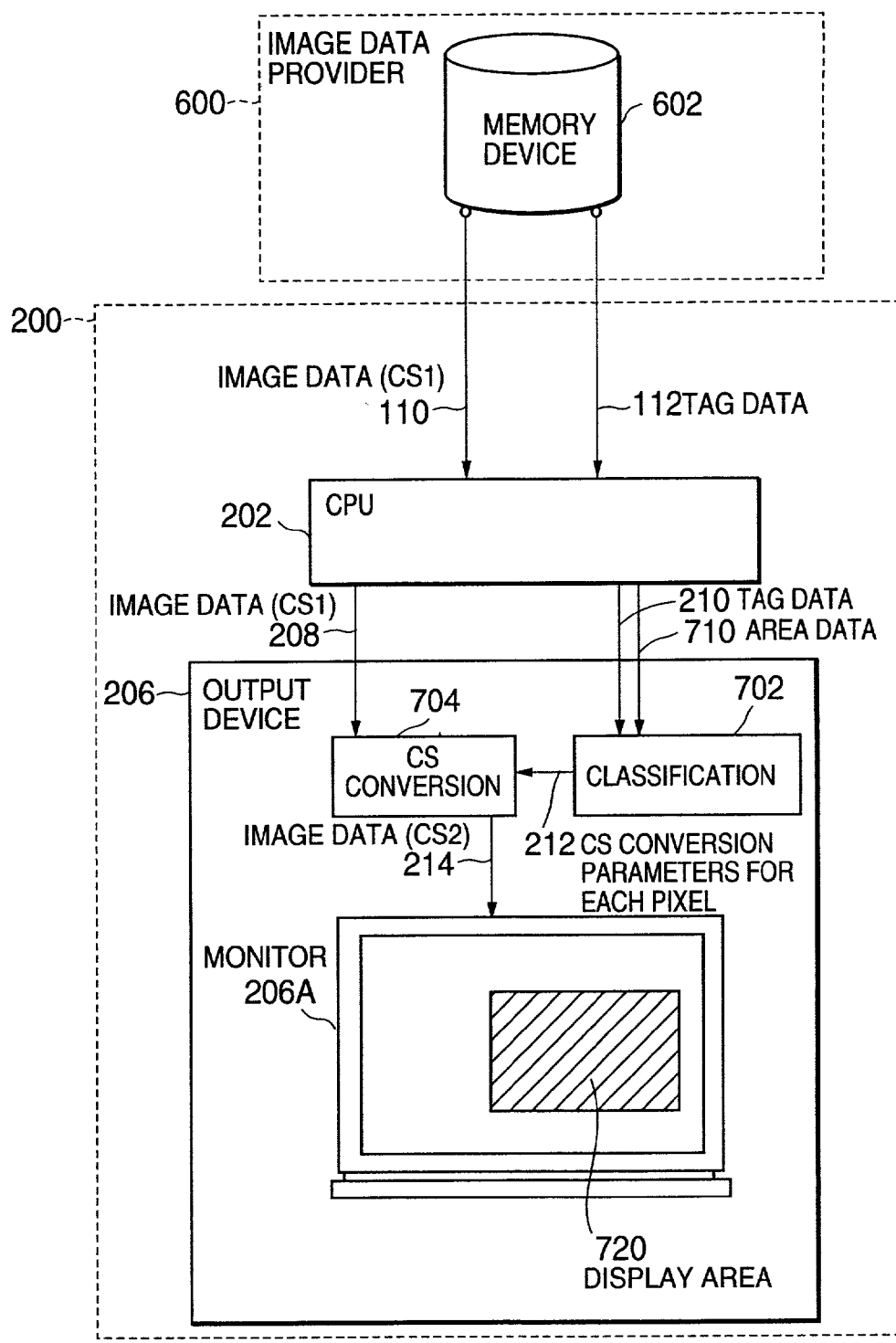
FIG. 12 depicts a block diagram of a ninth embodiment of a computer system according to the invention.

FIG. 12 depicts a block diagram of a ninth embodiment of a computer system according to the invention. The differences between FIG. 12 and FIG. 8 will be emphasized. In FIG. 12, the image data provider 600 can be a memory device 602 such as a Personal Computer Miniature Communications Interface Adapter (PCMCIA) memory card, a disk drive device or other memory device. The image data provider is connected to the CPU 202 via the signal paths 110 and 112.

The CPU 202 generates the area data indicating the display area 720 on the screen of the monitor 206A. The CPU 202 is connected to the CS conversion module 704 via the signal path 208. The CPU 202 is also connected to the CS conversion module 704 via the signal paths 210 and 710. The output of the classification unit 702 is connected to the CS conversion module 704 via the signal path 212.

The operation of the sixth to ninth embodiments will now be discussed.

In FIG. 8, the image data provider 215 provides image data based in a first color space (CS1) and tag data representing parameters of the first color space via signal paths 110 and 112, respectively, to the CPU 202 of the PC 200. The CPU 202 generates area data corresponding to the display area 720 within the screen of the monitor in which the image data is to be displayed. The CPU transmits the CS1 image data, without conversion, to the CS conversion module 704 within the output device 206 via signal paths 208. The CPU 202 also transmits, without conversion, the tag data to the classification unit 702 via the signal path 210, and transmits the area data to the classification unit 702 via the signal path 710.

The classification unit 702 determines whether each pixel is within the display area 720 or outside of the display area 720, based on the area data, and generates, based on the results of the determination and the tag data, CS conversion parameters for each pixel. For the pixels inside of the display area 720, the CS conversion parameters are generated based on the tag data supplied to the CPU 202 via the signal path 212.

For the pixels outside of the display area 720, the CS conversion parameters are generated based on different data, or in a different manner. For instance, the CS conversion parameters for the pixels outside of the display area 720 may be generated on the presumption that the image data to be displayed outside of the display area 720 is that of a default color space. The CS conversion parameters for the image within the display area 720 may also be used for the image outside of the display area 720. Furthermore, for the image outside of the display area 720, data indicating that no substantial CS conversion is applied (i.e., CS conversion by which the output image data is of the same color space as the input image data is performed) may be provided.

When the same CS conversion parameters as those of the preceding pixel can be used, e.g., when the pixels within the display area 720 are processed successively, or when the pixels outside of the display area 720 are processed successively, data to that effect, i.e., data indicating that the same CS conversion parameters may be used, may be generated and supplied to the CS conversion module 704 in place of the CS conversion parameters.

The CS conversion module 704 performs the CS conversion for each pixel in accordance with the CS conversion parameters for each pixel. As a result, the CS1 image data of the first color space supplied from the image data source 216 is automatically converted to the image data of the second color space (CS2), namely that of the monitor 206A, and displayed within the display area 720. The image for the outside of the display area 720 is CS-converted using CS conversion parameters determined separately from the CS conversion parameters for the image inside of the display area 720, and displayed outside of the display area 720.

The CS conversion module 704 outputs the image data of the second color space of the image within the display area 720 and of the image outside of the display area 720, to the monitor 206A via the signal path 214.

Similarly, in FIG. 11, the CS conversion module 706 performs the CS conversion on the image within the display area 720 and the image outside of the display area 720 using the CS conversion parameters for each pixel supplied from the classification unit 702.

An alternative implementation of the CS conversion module 704 is provided with the optional memory device 521 depicted in FIG. 11. In this alternative implementation, the classification unit 702 (for setting parameters) monitors the signal path 210 for tag data. If none is received within a predetermined time relative to the transmission of the image data over the signal path 210, then the classification unit 702 presumes that the color space of the image data corresponds to a default color space. The memory device 521 contains parameters that are representative of the default color space. The classification unit 702 causes the default parameters in the memory device 521 to be transferred to the process unit 510. The processing unit 510 performs the CS conversion on the pixels within the display area 720, using the supplied default parameters as the CS conversion parameters. As an example, the default color space can be sRGB.

In FIG. 9, the CS1 image data as well as the associated tag data and the area data are transmitted by the image provider 300 over the signal paths 208, 210 and 710, respectively, from the server 304 via the network 302. The output device 306 is capable of interfacing to the network 302. The operation of the classification unit 702, the CS conversion module 704, etc., remains substantially the same.

In FIG. 10, the data provider 406 transmits CS1 image data and its associated tag data over wireless signal paths 414 and 416, respectively, to the antenna 401 under control of the server 410 via the wireless network 408. The wireless interface 402 of the computing device 400 receives the CS1 image data and its associated tag data via the signal paths 418 and 420, respectively. The wireless interface 402 transfers the CS1 image data and its associated tag data to the CPU 404 via the signal paths 422 and 424, respectively.

The CPU 404 generates area data corresponding to the display area 720 of the screen of the monitor 206A in which the image data from the data provider 406 is to be displayed. The CPU 404 transfers the CS1 image data, without conversion, via the signal path 208 to the CS conversion module 704. The CPU also transfers the tag data, without conversion, via the signal path 210 to the classification unit 702, and also transfers the area data via the signal path 710 to the classification unit 702.

Again, the operation of the classification unit 702, the CS conversion module 704, etc., remains substantially the same.

In FIG. 12, the image data provider 600, e.g., the memory device 602, provides image data based in a first color space (CS1) and tag data representing parameters of the first color space via signal paths 110 and 112, respectively, to the CPU 202 of the PC 200. The operation of the CPU 202, etc., remains substantially the same as in FIG. 8.

In the embodiments described above, there is just one display area. There may however be two or more display areas. Moreover, the shape of the display area is not limited to rectangular. For instance, when two or more windows overlap each other, the area corresponding to one of the windows in front may be rectangular, but the area corresponding to the window at the back may be of a shape which is basically rectangular, but lacking part behind the window in front. When there are two or more display areas, they may be used to display image data of different color spaces. In such a case, different CS conversion parameters are used for the respective display areas.

Moreover, when a plurality of windows are displayed, CS conversion may be made using the CS conversion parameters only for the window which is in front. CS conversion may alternatively be performed for some of the windows only.

Figure 13:
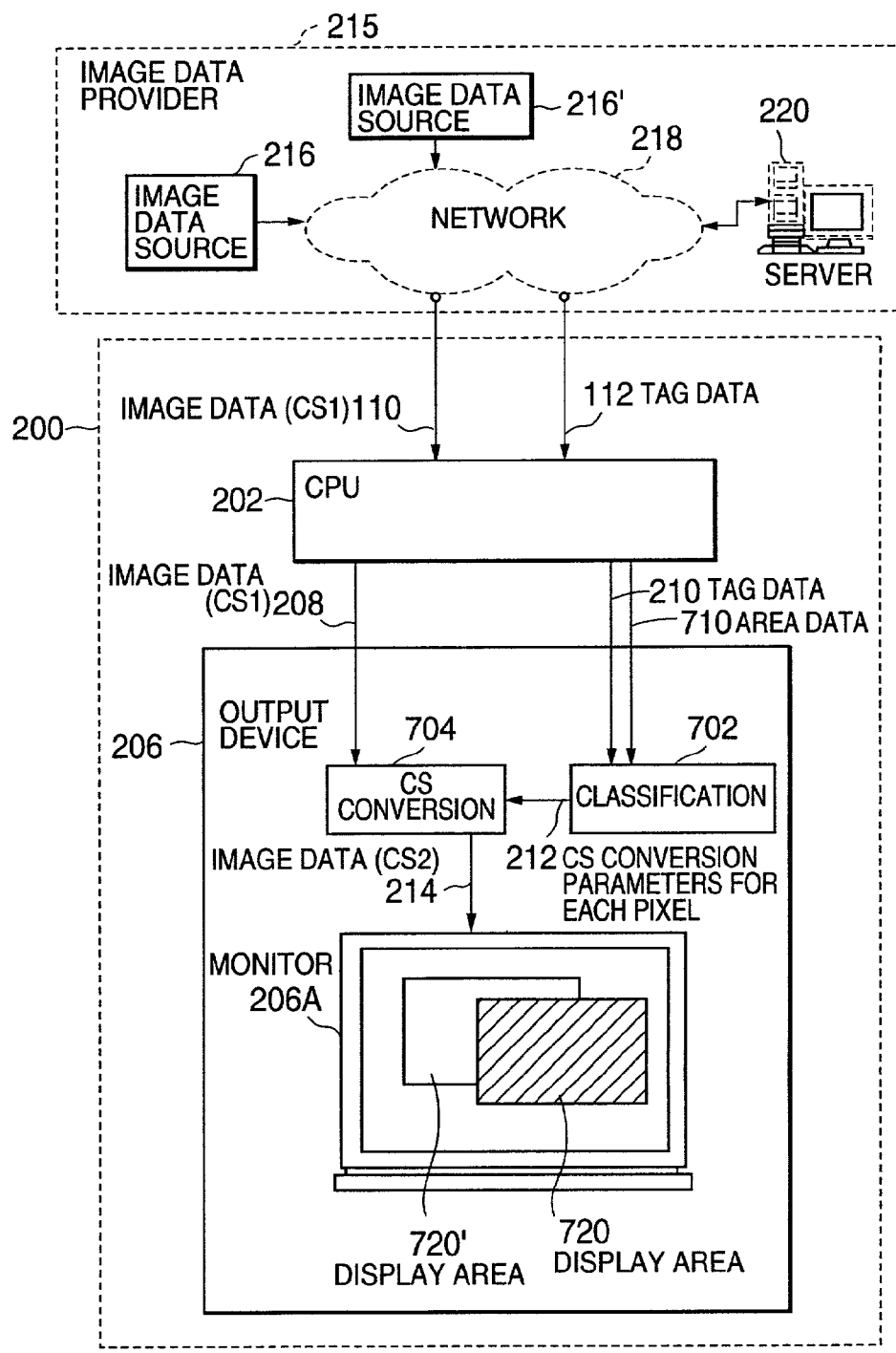
FIG. 13 depicts a block diagram of a tenth embodiment of a computer system according to the invention.

FIG. 13 shows another embodiment (tenth embodiment) in which two different original image data from two different image data sources are displayed in two display areas. The image processing system shown in FIG. 13 is generally identical to the image processing system of FIG. 8, but differs from it in the following respects. First, image data provider 215 includes a second image data source 216'. Like the (first) image data source 216, the second image data source 216' is connected to the CPU 202 via a network 218 run by a server 220.

The second image data source 216' supplies original image data (second original image data) of a color space (a fourth color space CS4) which may be different from or identical to the first color space (CS1) and associated tag data (second tag data).

The output device 206 of this embodiment displays the image obtained by conversion of the (first) original image data (CS1) supplied from the (first) image data source 216 in the (first) display area 720 forming part of the display screen of the monitor 206A, and displays the image obtained by conversion of the second original image data (CS4) supplied from the second image data source 216' in the second display area 720' forming another part of the display screen of the monitor 206A.

The CPU 202 can generate the second area data representing the second display area 720'.

The classification unit 702 determines whether each pixel is within the first display area 720, or within the second display area 720', or outside of both of the first and second display areas 720 and 720', in accordance with the first and second area data, and, based on the result of the determination and the first and second tag data, generates CS conversion parameters for each of the pixels, for the inside of the first display area 720, the inside of the second display area 720' and the outside of both the first and second display areas 720 and 720'.

The CS conversion module 704 converts the first original image data supplied from the first image data source 216 into the image data of the second color space (CS2) to be displayed in the first display area 720, in accordance with the CS conversion parameters for the inside of the first display area 720, supplied from the classification unit 702.

The CS conversion module 704 also converts the second original image data supplied from the second image data source 216' into the image data of the second color space (CS2) to be displayed in the second display area 720', in accordance with the CS conversion parameters for the inside of the second display area 720', supplied from the classification unit 702.

The CS conversion module 704 further converts the original image data for the outside of both the first and second display areas 720 and 720', into the image data of the second color space (CS2) to be displayed outside of both the first and second display areas 720 and 720', in accordance with the CS conversion parameters for the outside of both the first and second display areas 720 and 720', supplied from the classification unit 702.

In FIG. 13, the first image data provider 215 provides the first original image data based in a first color space (CS1) and the tag data representing parameters of the first color space via signal paths 110 and 112, respectively, to the CPU 202 of the PC 200. The second image data provider 215' provides the second original image data based in a fourth color space (CS4) and the tag data representing parameters of the fourth color space via signal paths 110 and 112, respectively, to the CPU 202 of the PC 200.

The CPU 202 generates the first area data corresponding to the first display area 720 within the screen of the monitor 206A in which the first original image data is to be displayed, and also generates the second area data corresponding to the second display area 720' within the screen of the monitor 206A in which the second original image data is to be displayed. The CPU transmits the first and second original image data to the CS conversion module 704 within the output device 206 via signal paths 208. The CPU 202 also transmits the first and second tag data, and the first and second area data to the classification unit 702 via the signal paths 210 and 710.

The classification unit 702 determines whether each pixel is within the first display area 720, or within the second display area 720', or outside of both the first and second display areas 720 and 720' based on the first and second area data, and generates, based on the results of the determination and the first and second tag data, CS conversion parameters for each pixel. For the pixels inside of the first display area 720, the CS conversion parameters are generated based on the first tag data supplied to the CPU 202 via the signal path 112. For the pixels inside of the second display area 720', the CS conversion parameters are generated based on the second tag data supplied to the CPU 202 via the signal path 112. For the pixels outside of both the first and second display areas 720 and 720', the CS conversion parameters are generated based on different data, or in a different manner.

The CS conversion module 704 performs the CS conversion for each pixel in accordance with the CS conversion parameters for each pixel. As a result, the CS1 image data of the first color space supplied from the first image data source 216 is automatically converted to the image data of the second color space (CS2), namely that of the monitor 206A, and displayed within the first display area 720; the CS4 image data of the fourth color space supplied from the second image data source 216' is automatically converted to the image data of the second color space (CS2), namely that of the monitor 206A, and displayed within the second display area 720'; and the image for the outside of both the first and second display areas 720 and 720' is CS-converted using CS conversion parameters determined separately from the CS conversion parameters for the images inside of the first and second display areas 720 and 720', and displayed outside of the first and second display areas 720 and 720'.

The CS conversion module 704 outputs the image data of the second color space of the image within the first display area 720, of the image within the second display area 720' and of the image outside of both the first and second display areas 720 and 720', to the monitor 206A via the signal path 214.

In FIG. 13, the second image data source 216' is shown to be separate from the first image data source 216. However, the first and second original image data (and the associated first and second tag data) may be supplied from the same image data source. Moreover, the first and fourth color spaces (CS4) need not be different from each other, but may be identical.

In connection with the tenth embodiment, it is described that the images for the display areas are CS-converted using CS conversion parameters generated based on the tag data supplied from the image data sources 216 and 216' in association with the original image data. However, as was described with reference to FIG. 5 or FIG. 11 in connection with the first to ninth embodiments, it may be so arranged that when no tag data is received in association with the first original image, the first original image may be CS-converted based on the presumption that the color space of the first original image is the default color space, and when no tag data is received in association with the second original image, the second original image may be CS-converted based on the presumption that the color space of the second original image is the default color space.

Some advantages of the invention will be discussed. By moving the CS conversion module to the output device, the invention relieves the CPU of the burden of having to convert image data of a first color space into a second color space. This makes it possible for computing devices equipped with this technology to display moving pictures that, by contrast, cannot be displayed according to the Background Art. And by making the conversion automatic by way of passing the tag data to the CS conversion unit, the invention relieves the viewer/user of having to optimize the settings of the output device each time the color space of the inputted image data changes.

Further, by having the CS conversion modules moved to the output devices, a computing device according to the invention can drive multiple output devices (that are designed to different color spaces) concurrently. And the multiple output devices can convert the image data into visually perceptible analogs thereof concurrently in real time.

The invention achieves output device independence for the CPU. In other words, the transfer of image data by a CPU to an output device can take place in an object-oriented manner, i.e., without the need for the CPU to adapt the image data to particularities of the output device. Conversely, output devices according to the invention achieve image data source independence, i.e., the output device can output image data from any color space (defined for the output device in advance) without the need to receive image data converted to the color space of the output device.

According to the sixth to tenth embodiments, CS conversion is performed using the CS conversion parameters determined based on the tag data for the image within the display area, while the identical or different CS conversion parameters may be used for the image outside of the display area, so that the CS conversion for the image within the display area can be achieved automatically, and the viewer/user need not participate in optimizing the setting of the output device each time the color space of the input image data is changed.

Moreover, when there are a plurality of display areas, CS conversion parameters are automatically generated for the respective display areas, and the CS conversion is performed using the generated CS conversion parameters, so that the optimum color reproduction is obtained for each of the display areas.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of outputting original image data generated relative to a first color space by an output device that converts image data of a second color space to a visually-perceptible analog thereof, the method comprising:
receiving from a provider, over a communication channel, original image data generated according to a first color space;

receiving from said provider, over a communication channel along with said original image data, tag data representing parameters of said first color space;

automatically converting, in said output device, said original image data into said second color space according to said tag data to produce converted image data of said second color space; and converting, in said output device, said converted image data into a visually-perceptible analog thereof.

2. The method of claim 1, wherein said tag data includes
a code identifying a color space,
primary coordinates,
white point,
brightness,
tone characteristics,
color reproduction characteristics,
still picture/moving picture identification code, or
parameters for image processing.

3. The method of claim 2, wherein
said tag data includes a combination of said primary coordinates and said tone characteristics,
said tone characteristics include a gamma value for said first color space and table values for tone conversion, or
said color reproduction characteristics include one of RGB signal levels for specific colors or a combination of hue, chroma and value coordinates.

4. The method of claim 3, wherein said hue, chroma and value coordinates are expressed in absolute magnitudes or relative magnitudes.

5. The method of claim 1, further comprising:
monitoring the presence of tag data, representing parameters of a color space, over said communication channel along with said image data;
presuming, if no tag data is received over said communication channel, that said first color space is a default color space; and
converting, in said output device, said original image data into said second color space based upon the presumption that said first color space is said default color space to produce said converted image data of said second color space.

6. The method of claim 1, wherein
said output device is a display device capable of displaying an image obtained by conversion from the original image data, in a display area forming part of a display screen of the display device; and
said display device generates color space conversion parameters for the display area, based on the tag data associated with the original image data and area data representing the display area, and converts the original image data into the image data of the second color space representing the image displayed in the display area, based on the generated color conversion parameters.

7. The method of claim 6, wherein said display device is capable of displaying an image obtained by conversion from second original data generated according to a third color space, in a second display area forming another part of the display screen of the display device,
said method further comprising:
receiving the second original image data over a communication channel from said provider; and
receiving, from said provider, over said communication channel along with said second original image data, second tag data representing parameters of the third color space;
wherein said display device generates color space conversion parameters for the second area based on second area data representing the second display area, and also based on said second tag data or on the presumption that the third color space is the default color space, and converts the second original image data into the image data of the second color space representing the image displayed in the second display area.

8. The method of claim 6, wherein
said display device is capable of displaying third original image data in part of the display screen outside of the display area, and
said display device generates color space conversion parameters for the outside of the display area, and converts the third original image data into the image data of the second color space representing the image displayed outside of the display area.

9. A method of outputting original image data that was generated relative to a first color space by an output device that converts image data of a second color space to a visually-perceptible analog thereof, the method comprising:
receiving from a provider, over a communication channel, original image data that was generated according to a first color space;
monitoring the presence of tag data, representing parameters of a color space, over said communication channel associated with said image data;
presuming, if no tag data is received over said communication channel, that said first color space is a default color space;
converting, in said output device, said original image data into said second color space based upon the presumption that said first color space is said default color space to produce converted image data of said second space; and
converting, in said output device, said converted image data into a visually-perceptible analog thereof.

10. The method of claim 9, wherein said default color space is standard RGB (sRGB).

11. The method of claim 9, further comprising:
retrieving data representing parameters of said default color pace, wherein said parameters include
a code identifying a color space, primary coordinates, white point, brightness, tone characteristics, color reproduction characteristics, still picture/moving picture identification code, or parameters for image processing.

12. The method of claim 11, wherein
said parameters include a combination of said primary coordinates and said tone characteristics,
said tone characteristics include a gamma value for said first color space and table values for tone conversion, or
said color reproduction characteristics include one of RGB signal levels for specific colors or a combination of hue, chroma and value coordinates.

13. An image processing system, comprising:
a provider of original image data;
a communications channel; and
an output device that converts image data of a second color space to a visually-perceptible analog of said image data,
said output device being operable to
receive said original image data, generated according to a first color space, from said provider over said communication channel;
receive, along with said image data, tag data representing parameters of said first color space from said provider over said communication channel;

convert said original image data relative to said first color space according to said tag data to produce converted image data of said second color space; and convert said converted image data into a visually-perceptible analog thereof.

14. The image processing system of claim 13, wherein said output device is further operable to monitor the presence of tag data, representing parameters of a color space, over said communication channel associated with said image data;

presume, if no tag data is received over said communication channel, said first color space as being a default color space; and convert said original image data relative to said first color space based upon the presumption that said first color space is said default color space to produce said converted image data of said second color space.

15. The image processing system of claim 13, wherein said provider includes a computing device and said communication channel includes a direct connection between said computing device and said output device;

said provider includes a memory device and said communication channel includes a direct connection between said memory device and said output device; or said provider includes a server and said communication channel includes a network to which said output device is connected.

16. The image processing system of claim 13, wherein said provider includes a server and said communication channel includes a network to which said output device is connected; and said output device includes a component of a personal computing device connected to said network.

17. The image processing system of claim 16, wherein said network connection is wireless.

18. The image processing system of claim 13, wherein said output device is a first output device and said converted image data is first converted image data, the image processing system further comprising:

a second output device that converts image data of a third color space to a visually-perceptible analog of said image data; and wherein said provider is operable to transmit said original image data to said second output device;

said provider is operable to transmit said tag data along with said original image data to said second output device;

said second output device is operable to convert said original image data relative to said first color space according to said tag data to produce second converted image data of said third color space; and said second output device is operable to convert said second converted image data into a visually-perceptible analog substantially simultaneously with said first output device converting said first converted image data into a visually-perceptible analog thereof.

19. The image processing system of claim 13, wherein said output device is a display device capable of displaying an image obtained by conversion from the original image data, in a display area forming part of a display screen of the display device; and said display device includes:

a parameter generating unit generating color space conversion parameters for the display area, based on the tag data associated with the original image data and area data representing the display area, and a processing unit converting the original image data into the image data of the second color space representing the image displayed in the display area, based on the generated color space conversion parameters.

20. The image processing system of claim 19, wherein said display device is capable of displaying an image obtained by conversion from second original data generated according to a fourth color space, in a second display area forming another part of the display screen of the display device, said provider supplies the second original image data;

said display device receives said second original image data over the communication channel from said provider; and said display devices receives, from said provider, over said communication channel along with said second original image data, second tag data representing parameters of the fourth color space;

wherein said parameter generating unit generates color space conversion parameters for the second area based on second area data representing the second display area, and also based on said second tag data or on the presumption that the fourth color space is the default color space, and said processing unit converts the second original image data into the image data of the second color space representing the image displayed in the second display area.

21. The image processing system of claim 19, wherein said display device is capable of displaying third original image data in part of the display screen outside of the display area, said parameter generating unit generates color space conversion parameters for the outside of the display area, and said processing unit converts the third original image data into the image data of the second color space representing the image displayed outside of the display area.

22. An image processing system, comprising:

a provider of original image data;

a communications channel; and an output device that converts image data of a second color space to a visually-perceptible analog of said image data said output device being operable to monitor the presence of tag data, representing parameters of a color space, over said communication channel along with said image data;

presume, if no tag data is received over said communication channel, said first color space as being a default color space;

convert said original image data relative to said first color space based upon the presumption that said first color space is said default color space to produce converted image data of said second color space; and convert said converted image data into a visually-perceptible analog thereof.

* * * * *